(12) United States Patent
Irwin

(10) Patent No.: US 9,373,993 B2
(45) Date of Patent: Jun. 21, 2016

(54) HAPTIC ACTUATORS

(71) Applicant: SAIA-BURGESS, INC., Vandalia, OH (US)

(72) Inventor: James C. Irwin, Beavercreek, OH (US)

(73) Assignee: SAIA-BURGESS, INC., Vandalia, OH (US)

( * ) Notice: Subject to any disclaimer, the term of this patent is extended or adjusted under 35 U.S.C. 154(b) by 406 days.

(21) Appl. No.: 13/935,655

(22) Filed: Jul. 5, 2013

(65) Prior Publication Data
US 2014/0009005 A1    Jan. 9, 2014

Related U.S. Application Data

(60) Provisional application No. 61/669,026, filed on Jul. 7, 2012, provisional application No. 61/745,691, filed on Dec. 24, 2012.

(51) Int. Cl.
*H04B 3/36* (2006.01)
*H02K 33/00* (2006.01)
(Continued)

(52) U.S. Cl.
CPC ............... *H02K 33/00* (2013.01); *G06F 3/016* (2013.01); *G06F 3/03547* (2013.01); *G06F 3/041* (2013.01); *H01F 7/127* (2013.01); *H01F 3/02* (2013.01)

(58) Field of Classification Search
CPC ......... H02K 33/00; H01F 7/127; G06F 3/016; G06F 3/041
USPC ................... 340/407.1; 318/460, 128, 451
See application file for complete search history.

(56) References Cited

U.S. PATENT DOCUMENTS 6,104,382 A    8/2000   Martin et al.
6,203,076 B1   3/2001   Wytcherley et al.
(Continued)

FOREIGN PATENT DOCUMENTS

KR   10-2012-0020485 A    3/2012
WO   2012-082072 A1       6/2012

OTHER PUBLICATIONS

Certified JP Application 2013-156687 filed Jul. 29, 2013.
(Continued)

*Primary Examiner* — Daryl Pope
(74) *Attorney, Agent, or Firm* — Nixon & Vanderhye, P.C.

(57) ABSTRACT

A haptic actuator (20(X)) provides compact mounting for a haptically-actuated assembly by mounting at least a portion of the haptically-actuated assembly to magnetic circuit members of the haptic actuator. The haptic actuator comprises a first magnetic member (62); a second magnetic member (60); a field generator (30); and a resilient connector (70). The first magnetic member (62) is configured to have a driven part (124) of the haptically-actuated assembly mounted to the first magnetic member (62). The second magnetic member (60) is selectively separated by at least one air gap from the first magnetic member (62) and is configured to have a stationary part of the haptically-actuated assembly (122) connected to the second magnetic member (62). The second magnetic member (60) is positioned at least partially within the field generator (30) and the first magnetic member (62) is positioned externally to the field generator (30). The resilient connector (70) is configured to connect together the first magnetic member (62) and the second magnetic member (60) in a manner to allow selective closing and opening of the at least one air gap upon selective activation and de-activation of the field generator (30).

30 Claims, 16 Drawing Sheets

(51) Int. Cl.
*G06F 3/01* (2006.01)
*H01F 7/127* (2006.01)
*G06F 3/041* (2006.01)
*G06F 3/0354* (2013.01)
*H01F 3/02* (2006.01)

(56) References Cited

U.S. PATENT DOCUMENTS

| | | | |
|---|---|---|---|
| 6,271,828 B1 | 8/2001 | Rosenberg et al. |
| 6,380,925 B1 | 4/2002 | Martin et al. |
| 6,429,846 B2 | 8/2002 | Rosenberg et al. |
| 6,680,729 B1 | 1/2004 | Shahoian et al. |
| 6,982,630 B2 | 1/2006 | Beckwith et al. |
| 6,982,696 B1 | 1/2006 | Shahoian |
| 7,148,875 B2 | 12/2006 | Rosenberg et al. |
| 7,209,118 B2 | 4/2007 | Shahoian et al. |
| 7,218,310 B2 | 5/2007 | Tierling et al. |
| 7,233,476 B2 | 6/2007 | Goldenberg et al. |
| 7,265,750 B2 | 9/2007 | Rosenberg |
| 7,336,006 B2 | 2/2008 | Watanabe et al. |
| 7,446,752 B2 | 11/2008 | Goldenberg et al. |
| 7,450,110 B2 | 11/2008 | Shahoian et al. |
| 7,548,232 B2 | 6/2009 | Shahoian et al. |
| 7,561,142 B2 | 7/2009 | Shahoian et al. |
| 7,567,243 B2 | 7/2009 | Hayward |
| 7,656,388 B2 | 2/2010 | Schena et al. |
| 7,728,820 B2 | 6/2010 | Rosenberg et al. |
| 7,764,268 B2 | 7/2010 | Gomez et al. |
| 7,768,504 B2 | 8/2010 | Rosenberg et al. |
| 7,777,716 B2 | 8/2010 | Rosenberg et al. |
| 7,825,903 B2 | 11/2010 | Anastas et al. |
| 7,919,945 B2 * | 4/2011 | Houston ............ A63F 13/06 310/14 |
| 7,944,435 B2 | 5/2011 | Rosenberg et al. |
| 7,978,183 B2 | 7/2011 | Rosenberg et al. |
| 7,982,720 B2 | 7/2011 | Rosenberg et al. |
| 8,031,181 B2 | 10/2011 | Rosenberg et al. |
| 8,049,734 B2 | 11/2011 | Rosenberg et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,072,317 B2 | 12/2011 | Sproelich et al. |
| 8,169,402 B2 | 5/2012 | Shahoian et al. |
| 8,963,665 B2 | 2/2015 | Sawaguchi |
| 2002/0030663 A1 | 3/2002 | Tierling et al. |
| 2003/0038776 A1 | 2/2003 | Rosenberg et al. |
| 2006/0187215 A1 | 8/2006 | Rosenberg et al. |
| 2006/0192771 A1 | 8/2006 | Rosenberg et al. |
| 2007/0013677 A1 | 1/2007 | Rosenberg et al. |
| 2007/0040815 A1 | 2/2007 | Rosenberg et al. |
| 2007/0195059 A1 | 8/2007 | Shahoian et al. |
| 2007/0229478 A1 | 10/2007 | Rosenberg et al. |
| 2007/0285216 A1 | 12/2007 | Tierling et al. |
| 2008/0060856 A1 | 3/2008 | Shahoian et al. |
| 2008/0062122 A1 | 3/2008 | Rosenberg et al. |
| 2008/0062145 A1 | 3/2008 | Shahoian et al. |
| 2008/0068348 A1 | 3/2008 | Rosenberg et al. |
| 2008/0068349 A1 | 3/2008 | Rosenberg et al. |
| 2008/0068350 A1 | 3/2008 | Rosenberg et al. |
| 2008/0068351 A1 | 3/2008 | Rosenberg et al. |
| 2008/0111788 A1 | 5/2008 | Rosenberg et al. |
| 2009/0174672 A1 | 7/2009 | Schmidt |
| 2009/0284498 A1 | 11/2009 | Hayward |
| 2009/0295552 A1 | 12/2009 | Shahoian et al. |
| 2010/0149111 A1 | 6/2010 | Olien |
| 2010/0245254 A1 | 9/2010 | Olien et al. |
| 2010/0309142 A1 | 12/2010 | Cruz-Hernandez et al. |
| 2011/0037546 A1 | 2/2011 | Marie |
| 2011/0109423 A1 | 5/2011 | Ramsay et al. |
| 2011/0227849 A1 | 9/2011 | Olien et al. |
| 2011/0309918 A1 | 12/2011 | Ramsay |
| 2012/0038582 A1 | 2/2012 | Grant |
| 2012/0056806 A1 | 3/2012 | Rosenberg et al. |
| 2012/0056839 A1 | 3/2012 | Rosenberg et al. |
| 2014/0176462 A1 | 6/2014 | Ponziani |

OTHER PUBLICATIONS

Certified JP Application 2012-249913 filed Nov. 14, 2012.
International Preliminary Report on Patentability mailed Jan. 22, 2015 in PCT Application No. PCT/US2013/049435.
International Search Report and Written Opinion mailed Oct. 16, 2013 in PCT Application No. PCT/US2013/049435.

* cited by examiner

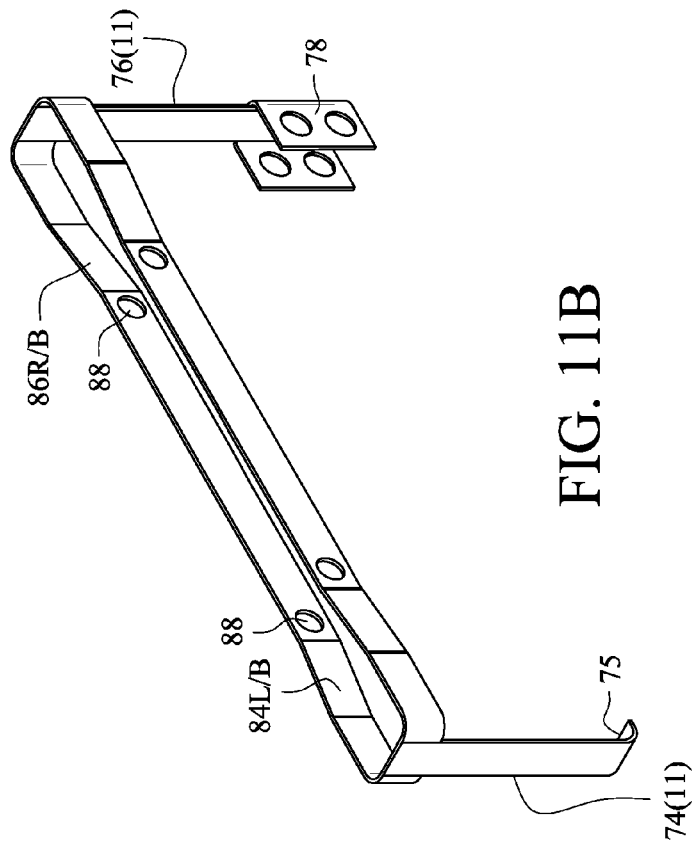
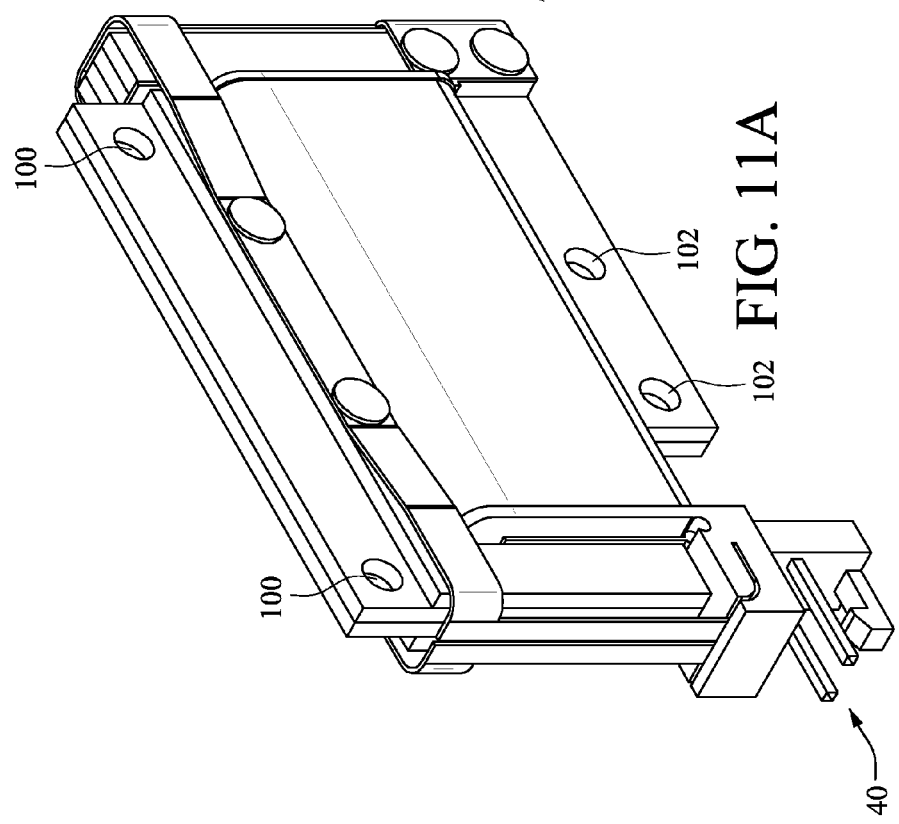

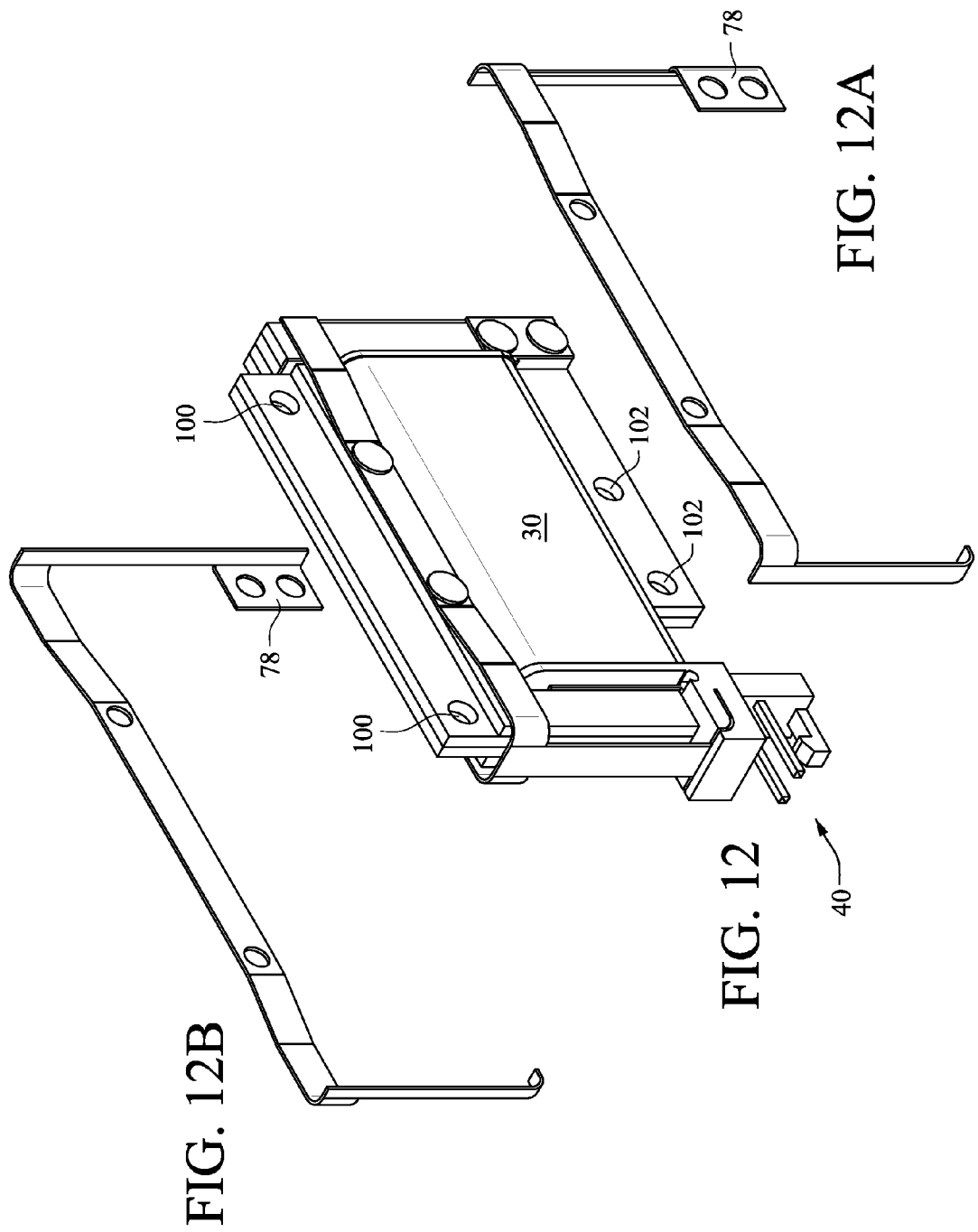

HAPTIC ACTUATORS

This application claims the benefit and priority of the following United States patent applications, both of which are incorporated herein by reference in their entireties: (1) U.S. Patent Application 61/669,026 filed Jul. 7, 2012; and (2) U.S. Patent Application 61/745,691 filed Dec. 24, 2012.

TECHNICAL FIELD

The technology relates to actuators, and particularly to haptic actuators.

BACKGROUND

Some devices provide a sensory feedback to the human user or operator so that the operator has confidence that the operation sought by the operator has been properly registered. Such is the case, for example, for some computer input devices, such as a mouse or other pointer device which provides a clicking sensation when depressed or operated. By contrast, some input devices, such as a touch screen, for example, do not provide such a click or sensory confirmation. For that reason, it has been proposed to use haptic technology so that, upon human input, a touch screen vibrates in order to provide the confirmatory feedback to the user that the touch screen is receptive to the input. In general, "haptics" is a field of technology which takes advantage of the sense of touch by applying forces, vibrations, or motions to the user Mechanical stimulation provided by haptic devices can be used to assist in the creation of virtual objects in a computer simulation, to control such virtual objects, and to enhance the remote control of machines and devices (telerobotics). Haptic devices may incorporate tactile sensors that measure forces exerted by the user on the interface.

There are many types of haptic electromechanical feedback devices. High definition haptic devices are typically designed to provide a haptic impulse response in less than 20 ms response time, with acceleration response values well exceeding 5-8 Gs.

High definition haptic devices have previously utilized housing structures external from a magnetic circuit to locate components of the magnetic circuit relative to mechanical actuation members, and to allow mounting to other system components. Use of a housing external from the magnetic circuit is also due in part to adverse affects on the magnetic circuit caused by the mounting structure, resulting in degradation in performance. As prior art housing structures require certain size packaging parameters to be used, this establishes size restrictions on where high definition actuation devices can be utilized. In particular, thin panel haptic devices have been unable to package high definition haptic actuators.

In one previous prior art example, an external mounting housing feature was combined to also provide a return spring function. But even in this prior art approach a significant amount of space is consumed. In any case where the frame is fabricated from a plastic material, there can also be inconsistencies in a spring rate of the device, as well as the plastic material having some internal damping while deflecting. These factors combine to produce less than ideal performance results.

SUMMARY

In accordance with one aspect of the technology disclosed herein, a haptic actuator provides compact mounting for a haptically-actuated assembly by mounting at least a portion of the haptically-actuated assembly to magnetic circuit members of the haptic actuator. The haptic actuator comprises a first magnetic member; a second magnetic member; a field generator; and a resilient connector. The first magnetic member is configured to have a driven part of the haptically-actuated assembly mounted to the first magnetic member. The second magnetic member is selectively separated by at least one air gap from the first magnetic member and is configured to have a stationary part of the haptically-actuated assembly connected to the second magnetic member. The second magnetic member is positioned at least partially within the field generator and the first magnetic member is positioned externally to the field generator. The resilient connector is configured to connect together the first magnetic member and the second magnetic member in a manner to allow selective closing and opening of the at least one air gap upon selective activation and de-activation of the field generator.

In an example embodiment the haptic actuator further comprises a non-magnetic member connected to second magnetic member. The non-magnetic member configured to have a stationary part of the haptically-actuated assembly mounted to the non-magnetic member, so that the stationary part of the haptically-actuated assembly is connected to the second magnetic member through the non-magnetic member.

Compactness of the haptic actuator results by forming one or more perimeter portions of the haptic actuator using strategic structural components. In an example embodiment, first magnetic member comprises at least a first portion of a perimeter of the haptic actuator; the non-magnetic member comprises at least a second portion of a perimeter of the haptic actuator; a first post member of the resilient connector comprises a third portion of a perimeter of the haptic actuator; and, a second post member of the resilient connector comprises a fourth portion of a perimeter of the haptic actuator. The second portion of the perimeter is essentially parallel to the first portion of the perimeter comprised by the first magnetic member, with the first portion of the perimeter and the second portion of the perimeter being orthogonal with respect to a height dimension of the haptic actuator. The first post member of the resilient connector is parallel to the second post member, with the third of portion of the perimeter and the fourth of portion of the perimeter being separated by a length dimension of the haptic actuator, the third portion of the perimeter and the fourth portion of the perimeter being orthogonal to both the first portion of the perimeter and the second portion of the perimeter.

In an example embodiment the second magnetic member comprises a mounting feature to which the stationary part of the haptically-actuated assembly is directly mounted. In an example embodiment, the first magnetic member comprises at least a first portion and a third portion of a perimeter of the haptic actuator, the second magnetic member comprises a fourth portion of a perimeter of the haptic actuator, and the field generator comprises a second portion of a perimeter of the haptic actuator. The resilient connector is situated with the perimeter of the haptic actuator. In an example implementation, the first portion of the perimeter and the second portion of the perimeter extend along a length dimension of the haptic actuator; the third portion of the perimeter and the fourth portion of the perimeter extend along a height dimension of the haptic actuator.

In an example embodiment, the first magnetic member comprises a mounting feature to which the driven part of the haptically-actuated assembly is directly mounted, and the non-magnetic member comprises a mounting feature to which the stationary part of the haptically-actuated assembly is directly mounted.

In an example embodiment, the resilient connector does not have the haptically-actuated assembly connected directly thereto.

In an example embodiment, the resilient connector comprises plural resilient portions; and wherein the first magnetic member and the second magnetic member are attached to different resilient portions of the resilient connector.

In an example embodiment, the resilient connector comprises a bridging spring member which extends between opposing spring post members. The first magnetic member is connected to the bridging spring member; the second magnetic member is connected to a first of the opposing spring post members. A second of the opposing spring post members is connected to a field generator connector assembly.

In an example embodiment, the first magnetic member comprises at least one first magnetic member aperture which is aligned with at least one bridging spring aperture. A fastener extends through the at least one first magnetic aperture and the at least one bridging spring aperture to connect the first magnetic member to the bridging spring member.

In an example embodiment, the first magnetic member comprises plural laminations, and the bridging spring member comprises two lamination capture brackets which are spaced apart to retain the plural laminations comprising the first magnetic member.

In an example embodiment, the resilient connector comprises a first resilient member and a second resilient member which are spaced apart in a stacking direction, both the first resilient member and the second resilient member being configured to permit oscillation in the size of the at least one air gap, and wherein the plural laminations comprising the first magnetic member are at least partially situated between a portion of the first resilient member and a portion of the second resilient member in the stacking direction.

In an example implementation, the first resilient member comprises a first resilient member spine situated at a first end of the field generator and a pair of spaced apart first resilient member cantilever arms which are attached to the first resilient member spine; and the second resilient member comprises a second resilient member spine situated at a second end of the field generator and a pair of spaced apart second resilient member cantilever arms which are attached to the second resilient member spine and which extend toward the pair of spaced apart first resilient member cantilever arms. The pair of spaced apart first resilient member cantilever arms and the pair of spaced apart second resilient member cantilever arms overlap each other. The first magnetic member is positioned between and connected to the pair of spaced apart first resilient member cantilever arms and the pair of spaced apart second resilient member cantilever arms. In an example embodiment, the second magnetic member is connected to the second resilient member spine.

In an example embodiment, the resilient connector comprises one resilient member configured to permit oscillation in the size of at least one air gap. The one resilient member comprises a resilient member spine to which the second magnetic member is connected and a pair of spaced apart resilient member cantilever arms which are attached to the resilient member spine and between which the first magnetic member is connected.

In an example embodiment, the field generator comprises a coil body. The coil body comprises a coil wound about a coil axis to form a coil interior space. The coil body comprises apertures in two opposing axial ends of the coil body. Plural pairs of magnetic laminations lie in corresponding plural parallel planes. In each pair of laminations the second magnetic member comprises a coil-accommodated lamination extending in an axial direction parallel to the coil axis, through the coil interior space, and protruding in the axial direction out of the apertures in the two opposing axial ends of the coil body. In each pair of laminations the first magnetic member comprises a coil-external lamination extending in a direction parallel to the coil axis and outside the coil body. The resilient connector comprises at least one resilient member configured to permit oscillation in the axial direction of the size of the at least one air gap between the coil-accommodated lamination and the coil-external lamination of each pair in accordance with application and removal of power to the coil.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 11A is a left isometric view of an assembled haptic actuator according to FIG. 11; and FIG. 11B is a left isometric view of a spring assembly of the haptic actuator of FIG. 11.

FIG. 12 is a left isometric view of a haptic actuator according to a third example embodiment, with spring assembly; FIG. 12A is a left isometric view of a front spring member of a spring assembly of the haptic actuator of FIG. 12; and FIG. 12B is a left isometric view of a rear spring member of a spring assembly of the haptic actuator of FIG. 12.

DETAILED DESCRIPTION

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 3:
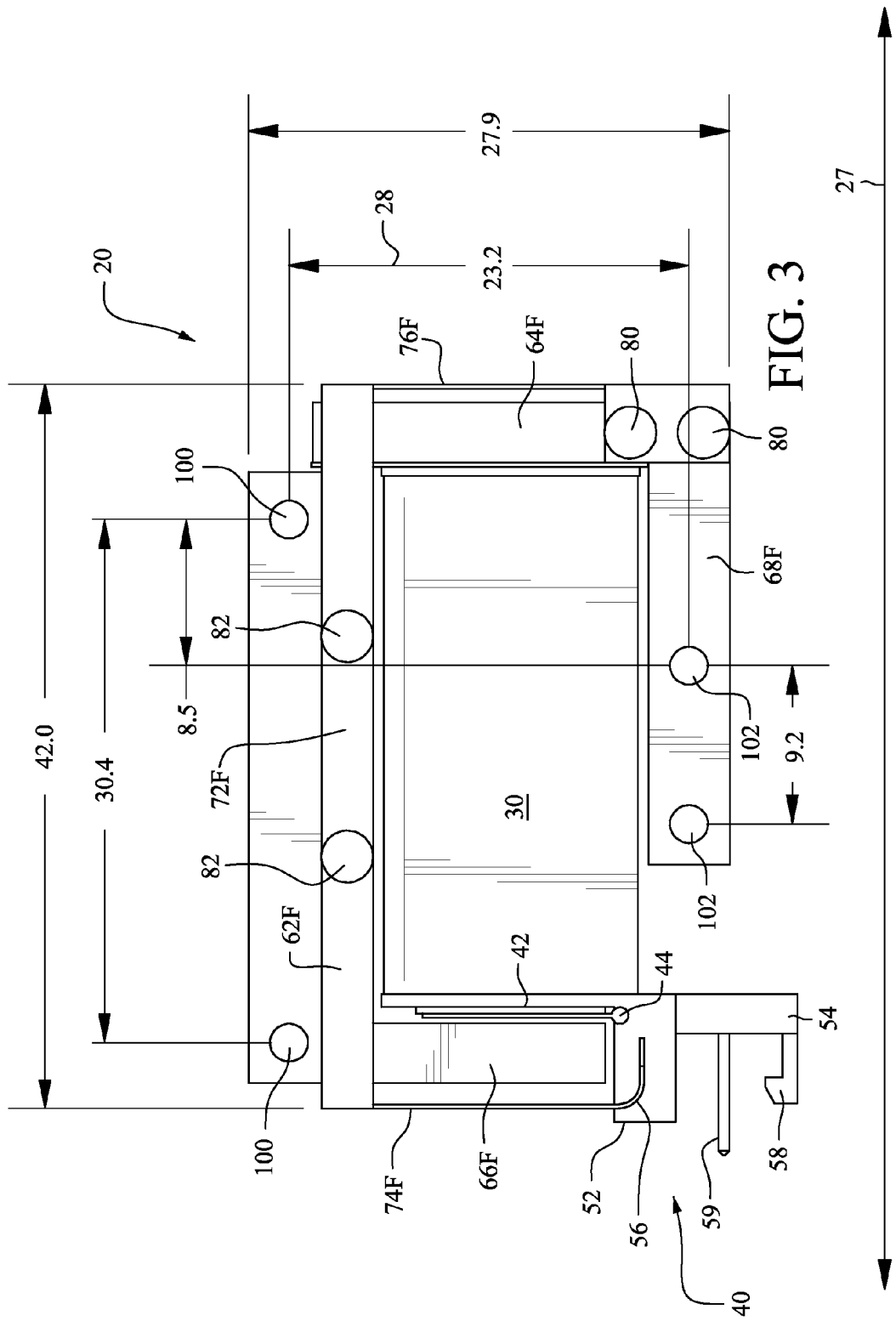
FIG. 3 is a front view of the haptic actuator of FIG. 1.
Figure 6:
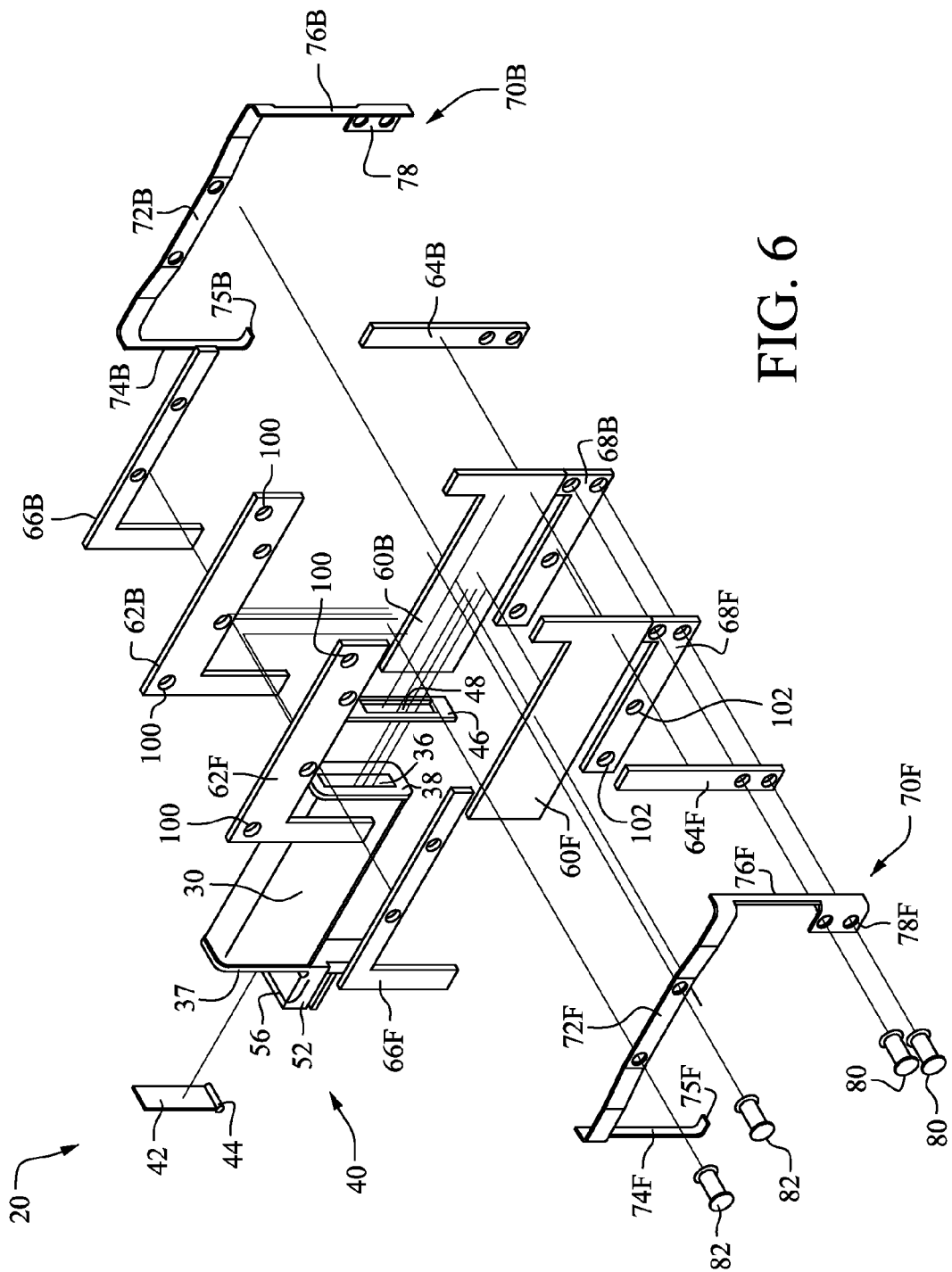
FIG. 6 is an exploded isometric view of the haptic actuator of FIG. 1.
Figure 7:
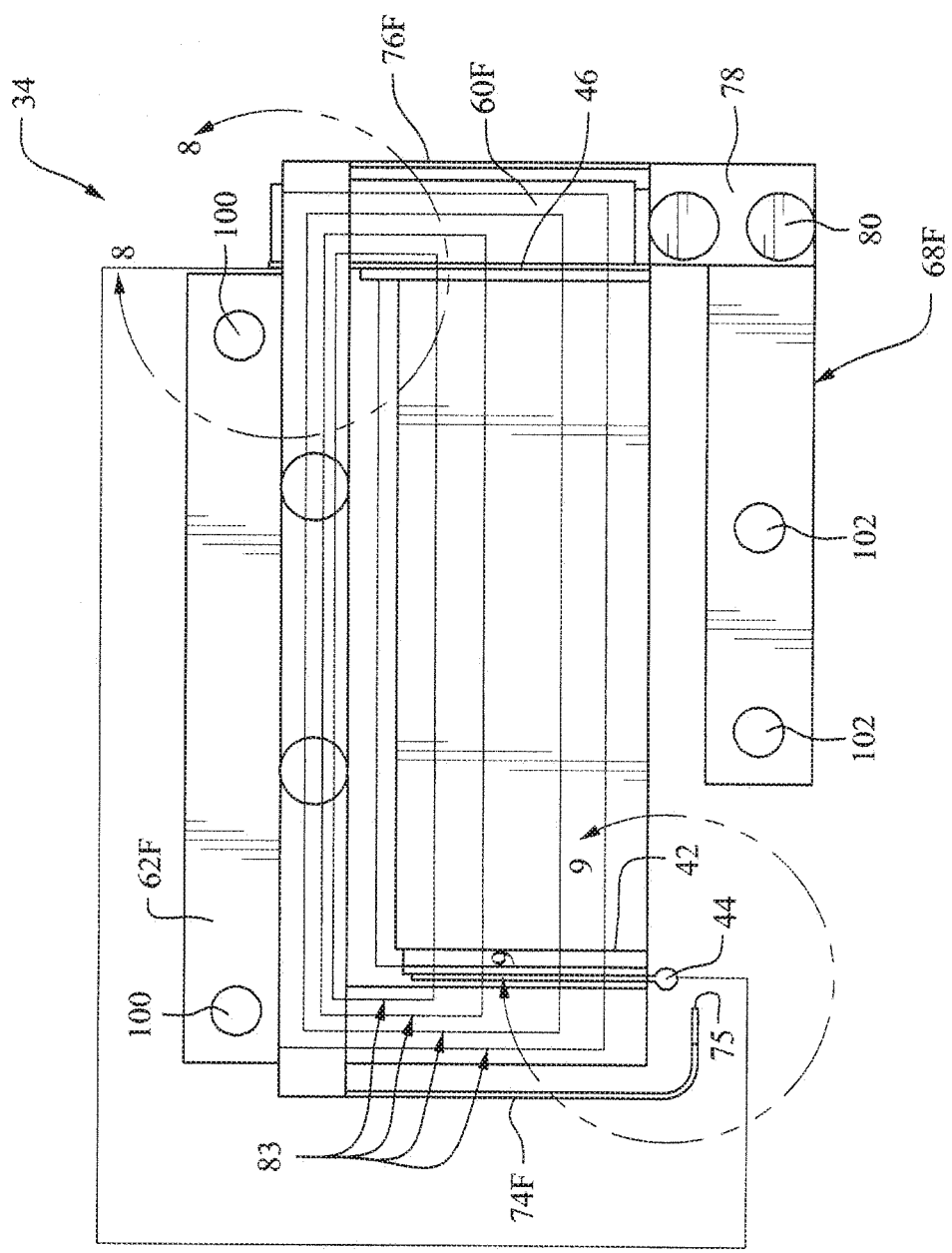
FIG. 7 is a front view of the haptic actuator of FIG. 1 with selected assemblies such as spring assembly and coil assembly removed.

FIG. 1-FIG. 10 show an example haptic actuator 20 according to a first example embodiment. The haptic actuator 20 comprises magnetic circuit 24 and frame assembly 26, both of which are described in more detail hereinafter. As shown in FIG. 3, the haptic actuator 20 has its length or major dimension 27 (also known as its axis) depicted by an arrow of the same numeral; its height or minor dimension 28 depicted by a comparably numbered arrow; and its thickness dimension 29 (perpendicular to the plane of the drawing of FIG. 3) depicted by a comparably numbered arrow (see, e.g., FIG. 4). As is illustrated in FIG. 7 and subsequently be explained in conjunction therewith, lines of magnetic flux created by the magnetic circuit 24 are essentially parallel to a plane formed by major dimension 27 and minor dimension 28.

The magnetic circuit 24 comprises coil body 30 and magnetically permeable material which may be configured as a stack of laminations 34 (see, e.g., FIG. 7). The coil body 30, which comprises and is also known as a field generator, has an essentially elongated (along major dimension 27) rectangular shape (with rounded or radiused corners) formed by coil windings which are wound about an axis parallel to major dimension 27. The windings of the coil of coil body 30 form coil interior space 36 (see FIG. 6). A left end of coil body 30 is at least partially bounded by coil left end cap 37; a right end of coil body 30 is partially bounded by coil right end cap 38.

Both coil left end cap 37 and coil right end cap 38 have rectangular apertures (with rounded or radiused corners) so that coil interior space 36 extends through both coil left end cap 37 and coil right end cap 38 as well. The coil left end cap 37 is connected to (e.g., may be integral with) a coil body connector assembly 40.

Impact spacers are provided at at least one axial end of coil body 30. Coil left end impact spacer 42 is provided at the left end of coil body 30 and is juxtaposed next to coil left end cap 37. As shown, for example, in FIG. 6, coil left end impact spacer 42 comprises a planar sheet member with a rolled or bulbous spacer bottom end 44 (see, e.g., FIG. 8). Coil right end impact spacer 46 is positioned at the mouth of coil right end cap 38 (see, e.g., FIG. 9). The coil right end impact spacer 46 has laminate access window 48 extending in the plane formed by major dimension 27 and thickness dimension 29. Both coil left end impact spacer 42 and coil right end impact spacer 46 may be formed from elastomeric material, for example. Likewise, any material that reduces impact noise and preferable, returns impact energy to the system may be used.

The coil body connector assembly 40 comprises flexible connector retention block 52 and coil body connector post 54. The flexible connector retention block 52 (see, e.g., FIG. 1) extends along major dimension 27 away from coil body 30 (e.g., toward the left in FIG. 1). The flexible connector retention block 52 includes retention slot 56 which extends the entire width of flexible connector retention block 52 along thickness dimension 29. Retention slot 56 is slightly spaced away from an end of flexible connector retention block 52 which is farthest from coil body 30. The retention slot 56 extends in an essentially "J" shape into flexible connector retention block 52, with a short leg of the "J"-shaped slot extending along the minor dimension 28 and a long leg of the "J"-shaped slot extending along the major dimension 27. On a proximal section of its upper surface, proximate coil body 30, coil left end impact spacer 42 has semi-circular impact spacer retaining groove 57 (see, e.g., FIG. 1) which is configured to retain the spacer bottom end 44 of coil left end impact spacer 42.

The coil body connector post 54 depends in cantilever fashion from flexible connector retention block 52 in the minor dimension 28, and is shorter than flexible connector retention block 52 along major dimension 27. At its distal end coil body connector post 54 has a resilient latching toe 58 that orthogonally extends away from coil body connector post 54 in the major dimension 27. The resilient latching toe 58 has an up-turned latch protrusion at its distal end. Two electrical connection wires or electrical connectors 59, which supply current to the coil of coil body 30, extend away from coil body connector post 54 in the major dimension 27. The electrical connectors 59 extend from coil body connector post 54 at a position intermediate (e.g., essentially half-way) between flexible connector retention block 52 and resilient latching toe 58.

The stack of laminations 34 (see, e.g., FIG. 7) comprises plural magnetic laminations. "Lamination" is a common term to describe magnetic members that are punched from thin sheet stock and stacked to form a larger magnetic member. For alternating current (A/C) devices, laminations break the eddy current path and reduce losses, but that is not the case here. The technology disclosed herein uses laminations because it is easier to manufacture the shape of the magnetic circuit, although the same objective may be accomplished using powdered metal or fine-blanking Some of the laminations in stack 34 (e.g., coil-accommodated laminations 60F and 60B) are configured and positioned for at least partial insertion within coil body 30 (e.g., in coil interior space 36). Others of the laminations in stack 34 (e.g., coil-external laminations 62F and 62B) are configured for positioning external to coil body 30 and have an essentially complementary shape to the coil-accommodated laminations. Yet others of the laminations in stack 34 serve to bound and position the stack of laminations 34 within the frame assembly 26, such as columnar laminations 64F and 64B and bridging laminations 66F and 66B.

The individual laminations in the stack 34 of laminations are illustrated in exploded format in FIG. 6. With the exception of columnar laminations 64F and 64B, each of the laminations in stack 34 have an essentially "L" shape, although the orientations and aspect ratios of various laminations may differ. FIG. 6 show that, with respect to major dimension 27, each of coil-accommodated laminations 60F and 60B as well as bridging laminations 66F and 66B have been rotated essentially ninety degrees in a clockwise direction about thickness dimension 29. On the other hand, with respect to major dimension 27 each of coil-external laminations 62F and 62R have been rotated essentially ninety degrees in a counter-clockwise direction about thickness dimension 29. Thus, a leg portion of each of coil-accommodated laminations 60F and 60B, bridging laminations 66F and 66B, and coil-external laminations 62F and 62B, are parallel to major dimension 27, while a "foot" portion of the same laminations are parallel to minor dimension 28. However, with respect to the minor dimension 28, the laminations have different height. For example, the height of the foot portion of coil-external laminations 62F and 62B along the minor dimension 28 is substantially equal to the height of the foot portions of both coil-accommodated laminations 60F and 60B and coil-external laminations 62F and 62B along minor dimension 28. Moreover, the height of the leg portion of coil-accommodated laminations 60F and 60B along the minor dimension 28 is greater than the height of the leg portion of bridging laminations 66F and 66B. Yet further, if placed in side-to-side manner in a plane parallel to that formed by the major dimension 27 and the minor dimension 28, coil-accommodated lamination 60F and coil-external lamination 62F would fit together in an essentially rectangular manner, and likewise (in a separate plane) for coil-accommodated lamination 60B and coil-external lamination 62B.

The reason why the two "L" shaped laminations have different aspect ratios is because the goal is to keep the cross sectional areas equal. The "L" with the shorter "foot" has a much smaller stacking height (i.e., two lamination thicknesses) while the lamination stack external to the coil has a height of four lamination thicknesses so the tall leg of the "L" only has to be half as wide to achieve the same cross sectional area.

As understood from FIG. 6, for example, the coil-accommodated laminations 60F and 60B are positioned in juxtaposition to one another along the thickness dimension 29 and fit into coil interior space 36, being inserted through the laminate access window 48 of coil right end impact spacer 46, through coil right end cap 38, and into the coil interior space 36. The ends of the leg portions (which extend along the minor dimension 28) are exposed and extend flush with or may even slightly protrude from coil left end cap 37. Being retained securely within coil body 30, the coil-accommodated laminations 60F and 60B are not moving laminations, but are essentially stationary laminations. By contrast, the coil-external laminations 62F, 62B, 66F, and 66B are moving (e.g., movable) laminations.

While primary L-shaped members of coil-accommodated laminations 60F and 60B are formed from magnetic material, secondary L-shaped members (e.g., laminations) 68F and 68R preferably formed from non-magnetic material depend from the respective coil-accommodated laminations 60F and 60B. The secondary L-shaped members (e.g., laminations) 68F and 68R are secured to their primary coil-accommodated laminations 60F and 60B. In FIG. 6, members 68F and 68R are sandwiched between members 64F and 64B. In the FIG. 6 example embodiment a fastener 80 (e.g., a rivet) goes through holes in the spring 70F, members 64F, 68F, 68R, 64B and through spring 70B. Alternatively, lamination stack of members 64F, 68F, 68R and 68R may be interlocked together. But, if in any embodiment such interlock is not practical, the members may be welded or riveted together as well. The attachment is such that the leg portions of the counter-clockwise rotated secondary L-shaped members (e.g., laminations) 68F and 68R are spaced away along minor dimension 28 from the comparable leg portions of the coil-accommodated laminations 60F and 60B, the spacing along the minor dimension 28 being sufficient from the coil body 30 to extend between the respective leg portions.

The frame assembly 26 of the example embodiment of FIG. 1-FIG. 9 comprises a spring assembly, the spring assembly in turn comprising front spring member 70F and back spring member 70B. The front spring member 70F and back spring member 70B are essentially mirror images of each other. Each spring member 70 comprises overhead bridging spring 72 which is held aloft at its respective two ends by spring left post 74 and spring right post 76. Each overhead bridging spring 72 extends in the major dimension 27 and comprises seven segments, including a right post-connecting segment, a left post-connecting segment, and a middle segment. Two intermediate segments are between the middle segment and each of the post-connecting segments. Both spring left post 74 and spring right post 76 depend along the minor dimension 28. The spring left post 74 terminates in a claw foot 75 that is configured to laterally slide for retention purposes into retention slot 56. The spring right post 76 is configured to cooperate with, e.g., the right post-connecting segment of overhead bridging spring 72 to accommodate the columnar laminations 64F, and distally terminates in a fastening plate 78. The fastening plate has apertures formed therein through which the fasteners 80 extend. Each overhead bridging spring 72 has two spaced apart apertures, with the apertures of the overhead bridging springs 72F and 72B being aligned to receive fasteners 82. The fasteners 82 extend through the overhead bridging springs 72, bridging lamination 66F, coil-external laminations 62F and 62R, and bridging lamination 66B.

The spring members 70F, 70B do not comprise the magnetic circuit, but position and guide the moving parts, e.g., external laminations 66F, 62F 62B and 66B, relative to the stationary part. The stationary part is essentially everything else (e.g., laminations 64F, 60F, 60B, 64B, 68F and 68B), although the spring could be considered moving (overhead section) or stationary (distal end of spring posts).

Figure 8:
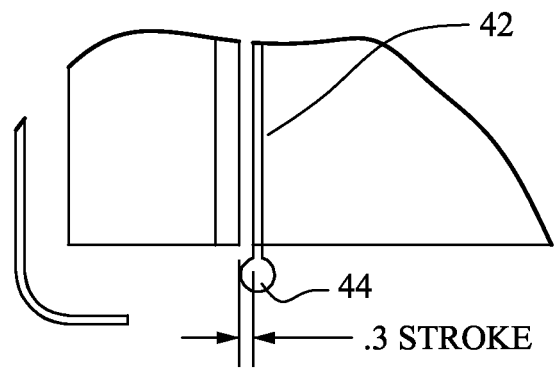
FIG. 8 is an enlarged detailed front view of portions of the haptic actuator of FIG. 1 taken along line 8-8 of FIG. 7.
Figure 9:
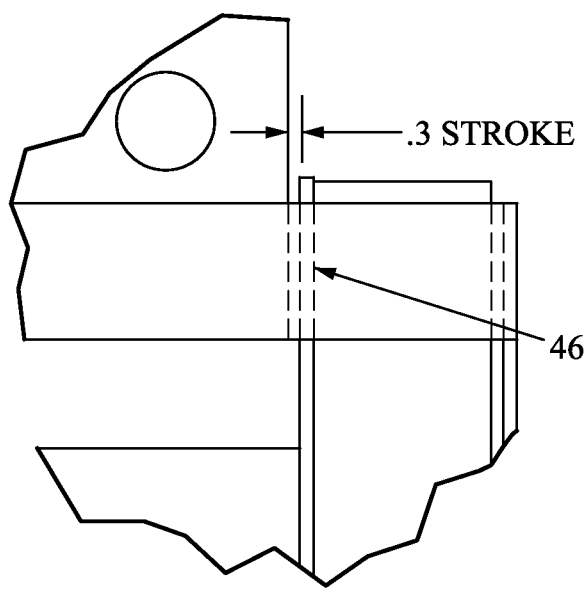
FIG. 9 is an enlarged detailed front view of portions of the haptic actuator of FIG. 1 taken along line 9-9 of FIG. 7.
Figure 10:
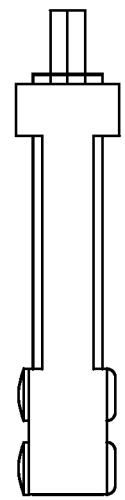
FIG. 10 is a right end view of the haptic actuator of FIG. 1 showing a coil right end impact spacer.

Spring right posts 76F and 76R serve a spring function, allowing the upper lamination (e.g., coil-external laminations 62F and 62B and 66F and 66B) to move relative to the lower lamination (e.g., coil-accommodated laminations 60F and 60B and 64F and 64B) and to position the upper lamination in order to set one or more air gaps. The air gap exists between the coil-external laminations 62F and 62B and 66F and 66B and the coil-accommodated laminations 60F and 60B and 64F and 64B at the axial ends of coil body 30, e.g., where the coil left end spacer 42 and coil right end spacer 46 are positioned. The air gap is shown in FIG. 8, where the 0.3mm stroke is one of the air gaps and also shown in FIG. 9 where the 0.3mm stroke is the other air gap.

Spring right posts 76F and 76R serve a spring function, allowing the upper lamination (e.g., coil-external laminations 62F and 62B and 66F and 66B) to move relative to the lower lamination (e.g., coil-accommodated laminations 60F and 60B and 64F and 64B) and to position the upper lamination in order to set one or more air gaps. The air gap exists between the coil-external laminations 62F and 62B and 66F and 66B and the coil-accommodated laminations 60F and 60B and 64F and 64B at the axial ends of coil body 30, e.g., where the coil left end spacer 42 and coil right end spacer 46 are positioned. The air gap is shown in FIG. 8, where the 0.3mm stroke is one of the air gaps and also shown in FIG. 9 where the 0.3mm stroke is the other air gap.

The spring members 70F and 70B are oriented so that the stack 34 of laminations may be positioned and engaged therebetween. As understood from FIG. 6, there are several layers or planes of lamination that are sandwiched between spring members 70F and 70B. In order from spring member 70F to spring member 70B are the following essentially planar layers: first layer comprising bridging lamination 66F and columnar lamination 64F; a second layer comprising coil-external lamination 62F and coil-accommodated lamination 60F; a third layer comprising coil-external lamination 62B and coil-accommodated lamination 60B; and, a fourth layer comprising bridging lamination 66B and columnar lamination 64B. The layers of laminations are secured between spring members 70F and 70B by fasteners 80 and 82. The fasteners 80 and 82 may be, for example, press-fit pins or the like that extend through aligned apertures in the spring members 70 and various ones of the laminations, as shown in FIG. 6.

In FIG. 7 arrows labeled as 83 point to pseudo flux lines. When coil body 30 is supplied with electric current, coil body 30 generates a magnetic field. The magnetic field will seek to travel in the lowest resistance path from the center of the coil, around the outside of the coil and back to the center. As magnetically permeable material consumes less energy to travel through than air, the magnetic field will be majorly confined to the magnetic material which in general has been referred to as "laminations". The path of constant magnetic potential is called a flux line. These flux lines are represented in FIG. 7 as traveling though, for one, lamination 60F, across the air gap to lamination 62F, across the other air gap and back to lamination 60F. Whereas, the lines of constant magnetic potential will not be evenly spaced, they will generate concentric paths through and around the coil. The advantage of this arrangement is a) having the shortest magnetic path possible, b) having air gaps juxtaposed to each other to evenly distribute flux density and avoid extraneous losses, and c) maintaining a constant cross section. One disadvantage is the need for multiple sizes and shapes for the laminations.

In an example embodiment, components of haptic actuator 20 other than the coil body 30 and the stack 34 of laminations may be comprised of any suitable non-magnetic material, such as plastic, for example.

From the foregoing it is understood that haptic actuator 20 of FIG. 1-FIG. 10 comprises at least one first magnetic member 62; at least one second magnetic member 60; a field generator (also known above as coil body 30); and a connector or spring member or resilient connector 70 which essentially entirely comprises the frame assembly 26. As used herein, the reference numeral 62 refers to any one or more of the coil external laminations and the reference numeral 60 refers to any one or more of the coil-accommodated laminations.

It is further understood that the first magnetic member 62 is configured to have a driven part of the haptically-actuated assembly mounted to the first magnetic member. To this end the first magnetic member 62, as well as any other magnetic members stacked therewith, have apertures 100 through which a fastener may affix a driven part of the haptically-actuated assembly directly to the one or more first magnetic members. The at least one second magnetic member 60 is selectively separated by at least one air gap from the first magnetic member 62. The second magnetic member is configured to have a stationary part of the haptically-actuated assembly connected to the second magnetic member 60 by virtue of the second magnetic member 60 having non-magnetic member 68 connected thereto, and the non-magnetic member 68 in turn having the stationary part of the haptically-actuated assembly mounted to the non-magnetic member 68. For example, the non-magnetic member 68 and any other non-magnetic members stacked therewith, have apertures 102 through which a fastener may affix a stationary part of the haptically-actuated assembly directly to the one or more non-magnetic members.

As understood from the foregoing, the second magnetic member 60 is positioned at least partially within the field generator or coil body 30, and the first magnetic member 62 is positioned externally to the field generator or coil body 30.

The spring member or resilient connector 70 is configured to connect together the first magnetic member 62 and the second magnetic member 60 in a manner to allow selective closing and opening of the at least one air gap upon selective activation and de-activation of the field generator 30.

Compactness of the haptic actuator 20 of FIG. 1-FIG. 10 results by forming one or more perimeter portions of the haptic actuator using strategic structural components. In an example embodiment, first magnetic member 62 comprises at least a first portion of a perimeter of the haptic actuator; the non-magnetic member 68 comprises at least a second portion of a perimeter of the haptic actuator; a first post member 74 of the resilient connector comprises a third portion of a perimeter of the haptic actuator; and, a second post member 76 of the resilient connector 70 comprises a fourth portion of a perimeter of the haptic actuator. The second portion of the perimeter is essentially parallel to the first portion of the perimeter comprised by the first magnetic member, with the first portion of the perimeter and the second portion of the perimeter being orthogonal with respect to a height dimension of the haptic actuator.

Figures 4, 5:
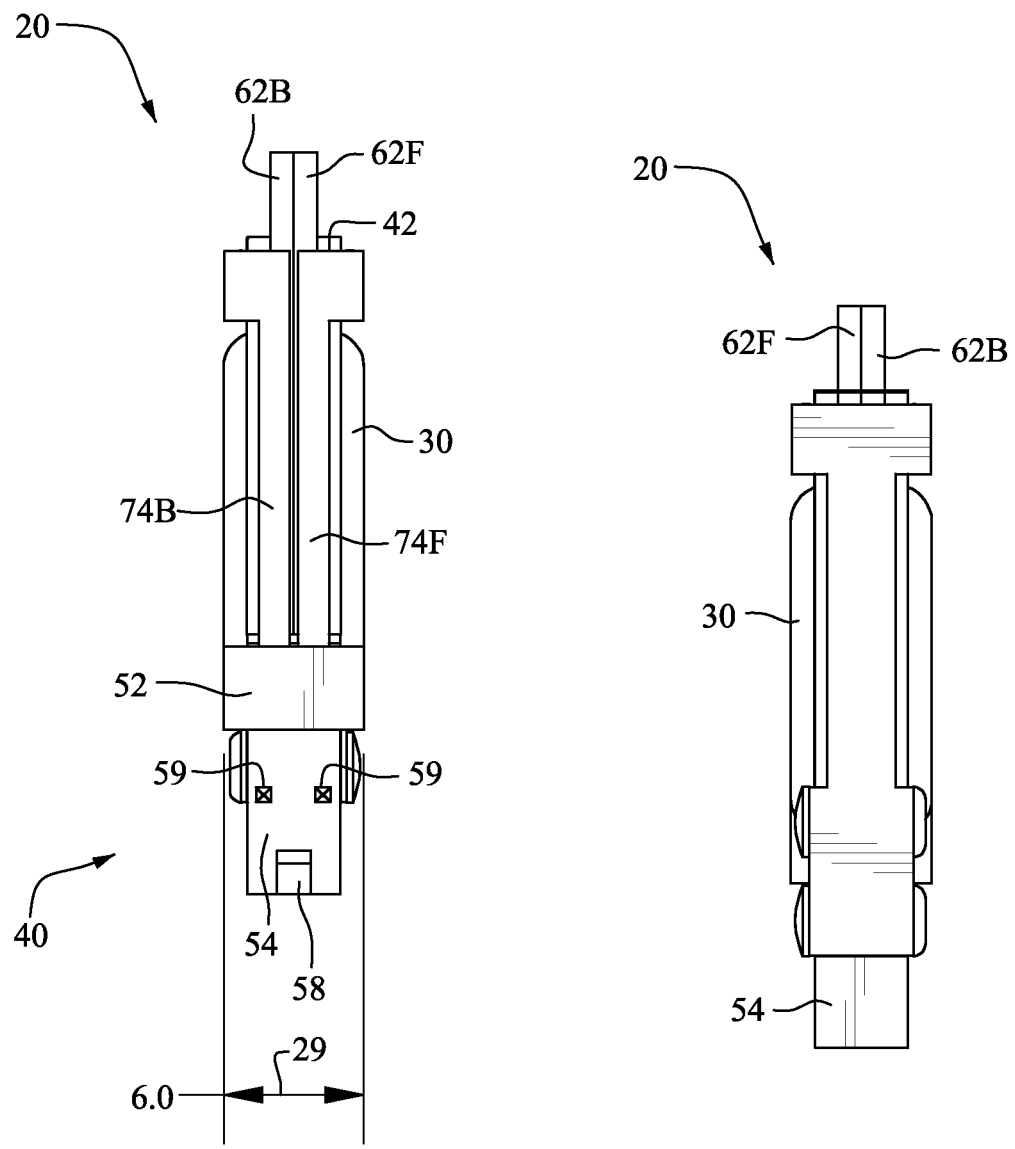
FIG. 4 is a left end view of the haptic actuator of FIG. 1.
FIG. 5 is a right end view of the haptic actuator of FIG. 1.

The first post member 74 of the resilient connector 70 is parallel to the second post member 76, with the third of portion of the perimeter and the fourth of portion of the perimeter being separated by a length dimension of the haptic actuator. The third portion of the perimeter and the fourth portion of the perimeter are orthogonal to both the first portion of the perimeter and the second portion of the perimeter. In an example embodiment, the extent of the haptic actuator 20 along the length dimension 27 is about 42 mm; the extent of the haptic actuator 20 along the height dimension 28 is about 30 mm; and extent of the haptic actuator 20 along the thickness dimension 29 is less than 8 mm, and preferably about 6 mm as shown in FIG. 4. Thus, an aspect ratio of thickness of the haptic actuator 20 to its next smallest dimension is about 1:5.

Thus, as understood from the foregoing, the field generator comprises coil body 30. The coil body 30 comprises a coil wound about a coil axis to form a coil interior space. The coil body 30 comprises apertures in two opposing axial ends of the coil body. Plural pairs of magnetic laminations 62/60 lie in corresponding plural parallel planes. In each pair of laminations 62/60 the second magnetic member comprises a coil-accommodated lamination 60 extending in an axial direction parallel to the coil axis, through the coil interior space 36, and protruding in the axial direction out of the apertures in the two opposing axial ends of the coil body 30. In each pair of laminations 62/60 the first magnetic member 62 comprises a coil-external lamination extending in a direction parallel to the coil axis and outside the coil body 30. The resilient connector 70 comprises at least one resilient member configured to permit oscillation in the axial direction of the size of the at least one air gap between the coil-accommodated lamination 60 and the coil-external lamination 62 of each pair 62/60 in accordance with application and removal of power to the coil 30.

The technology disclosed herein incorporates the mounting function as part of the stack 34 of laminations. The "mounting function" refers to the holes 100 in the laminations (68F and 68R) that will attached the stationary part of the actuator to the stationary part of the next assembly (e.g., the haptically-actuated assembly) and the hole 102 in 62F and 62B that will attach the moveable part of the actuator to the driven part of the next assembly. As an aspect the technology disclosed herein includes non-magnetic laminations, e.g., secondary L-shaped members (e.g., laminations) 68F and 68R, for the mounting feature so that performance is not adversely affected, while using multiple magnetic laminations (e.g., coil-accommodated laminations 60F and 60B, coil-external laminations 62F and 62B, columnar laminations 64F and 64B, and bridging laminations 66F and 66B) for the lamination stack 34.

Also provided is the spring assembly which provides a more consistent spring rate as well as a more efficient energy transfer. With the spring being metal, it will be insensitive to problems normally associated with plastic spring such as temperature, damping, life, and variability due to dimensional tolerances. The spring assembly is firmly attached to the lamination stack 34 and maintains excellent positioning characteristics of the moving members to the mounting features, e.g., to moving members 66 and 62 and stationary members 60, 64 and 68.

In the example embodiment of FIG. 1-FIG. 5, the spring is one piece of metal as can be viewed in FIG. 5 by noticing there is no slit running down the length in that view. The spring of FIG. 5 may be made by making the two sides and folding about the right end post. By contrast, FIG. 6 shows an example embodiment in which the spring made as two separate pieces.

Figure 11:
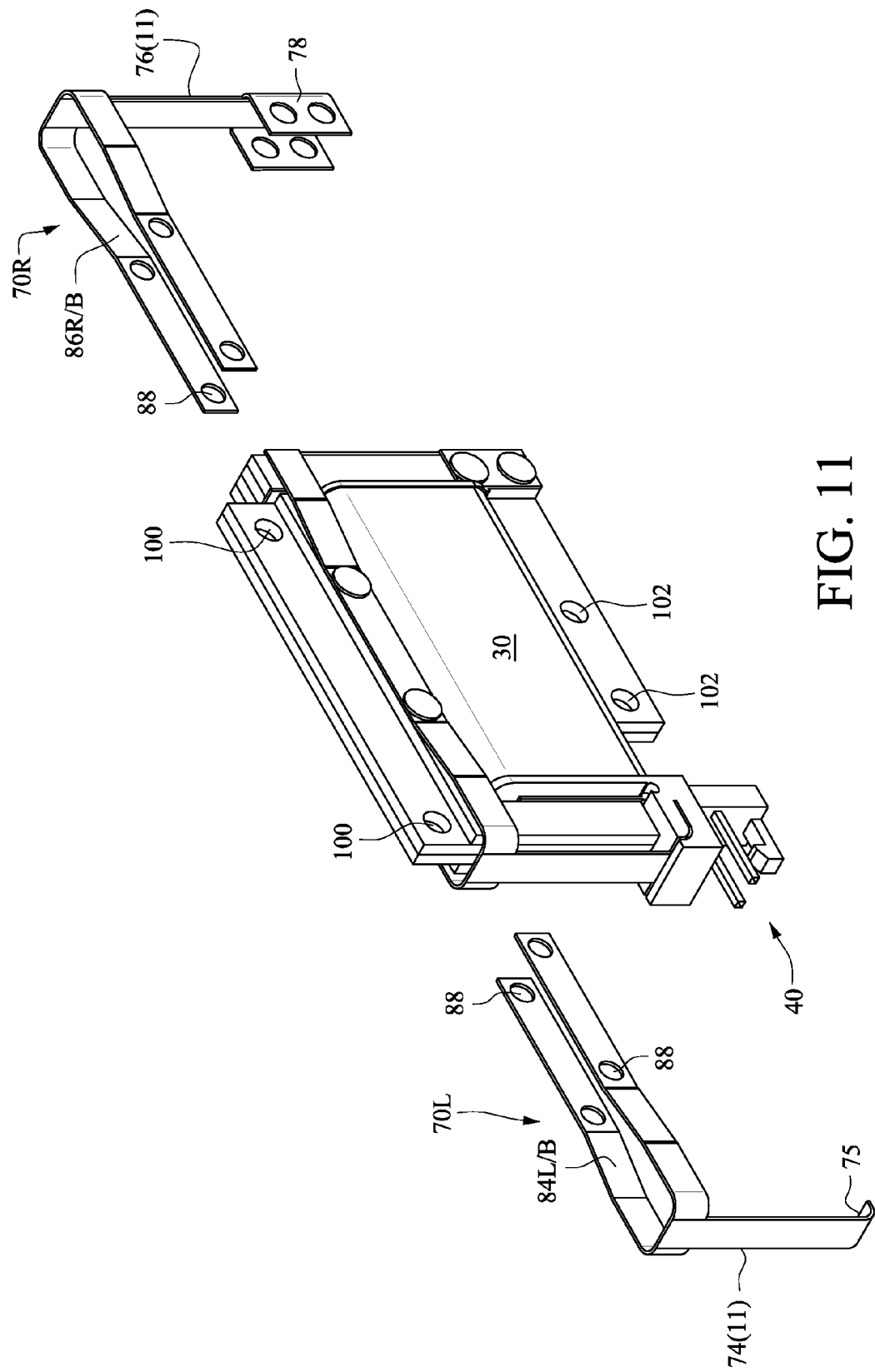
FIG. 11 is a left isometric exploded view of a haptic actuator according to a second example embodiment.

The technology disclosed herein encompasses other embodiments of spring assemblies and mounting mechanisms. A second example embodiment is shown in exploded fashion by FIG. 11, with FIG. 11A showing elements of the actuator without the spring mounting assembly and FIG. 11B showing essentially the spring mounting assembly as assembled but without the actuator. It will be recalled that the spring assembly of FIG. 1 includes front spring member 70F and back spring member 70B, which are essentially mirror images of each other, and that each spring member 70F, 70B comprises overhead bridging spring 72, spring left post 74, and spring right post 76. In the embodiment of FIG. 11, on the other hand, the spring mounting assembly comprises left spring member 70L and right spring member 70R. The left spring member 70L and right spring member 70R are also known as a first resilient member and a second resilient member. In the FIG. 11 embodiment, there is only one spring left post 74(11) which comprises the left spring member 70L; and only one spring right post 76(11) which comprises the right spring member 70R. The spring left post 74(11) is also known as a first resilient member spine, and is situated at a first end (e.g., left end) of the coil body 30. The right spring member 70R is also known as a second resilient member spine and is situated at a second or right end of the coil body 30.

The left spring member 70L also comprises a pair of spaced apart first resilient member cantilever arms 84L, which are attached to a top of the spring left post/spine 74(11) and which extend in the axial direction. In particular, a first left spring member cantilever arm 84L/F extends in the axial direction on a front side of the actuator, while a second left spring member cantilever arm 84L/B extends in the axial direction on a back side of the actuator.

Similarly, the right spring member 70R also comprises a pair of spaced apart second resilient member cantilever arms 86R, which are attached to a top of the spring right post/spine 76(11) and which extend in the axial direction. In particular, a first right spring member cantilever arm 86R/F extends in the axial direction on a front side of the actuator, while a second right spring member cantilever arm 86R/B extends in the axial direction on a back side of the actuator.

Each of the spring member cantilever arms 84 and 86 are formed by plural resilient arm segments, including a collar segment by which each arm attaches to its respective post or spine; a distal segment which extends essentially parallel to the axial direction; and two segments which are intermediate the collar segment and the distal segment. The one of the two intermediate segments that is closest to the collar segment may extend essentially parallel to the axial direction, but the other of the two intermediate segments, e.g., the intermediate segment closest to the distal segment, is resiliently inclined at an angle to the axial direction to connect the distal segment to the remainder of the spring member cantilever arm.

In the embodiment of FIG. 11, the pair of spaced apart first resilient member cantilever arms 84 and the pair of spaced apart second resilient member cantilever arms 86 are each formed to have an essentially U shape. The distal segments of the cantilever arms 84 and 86 overlap each other in the axial direction. The distal segments of both spring member cantilever arm 84, 86 have two aligned apertures 88. In assembly, the aligned apertures 88 of the spring member cantilever arm 84, 86 are also aligned with apertures in the bridging lamination 66F, coil-external laminations 62F and 62B, and bridging lamination 66B, as understood from the previous embodiment. Thus, in the FIG. 11 embodiment the coil-external laminations of the plural pairs of laminations are positioned between and connected to the pair of spaced apart first resilient member cantilever arms 84 and the pair of spaced apart second resilient member cantilever arms 86.

The spring left post/spine 74(11) has a claw foot 75 which is configured to laterally slide for retention purposes into retention slot 56 of flexible connector retention block 52. The spring right post/spine 76(11) has, at its lower distal end, fastening plate 78 having apertures formed therein through which the fasteners 80 extend.

A third example embodiment is illustrated by FIG. 12A, FIG. 12B, and FIG. 12C.

Figure 13:
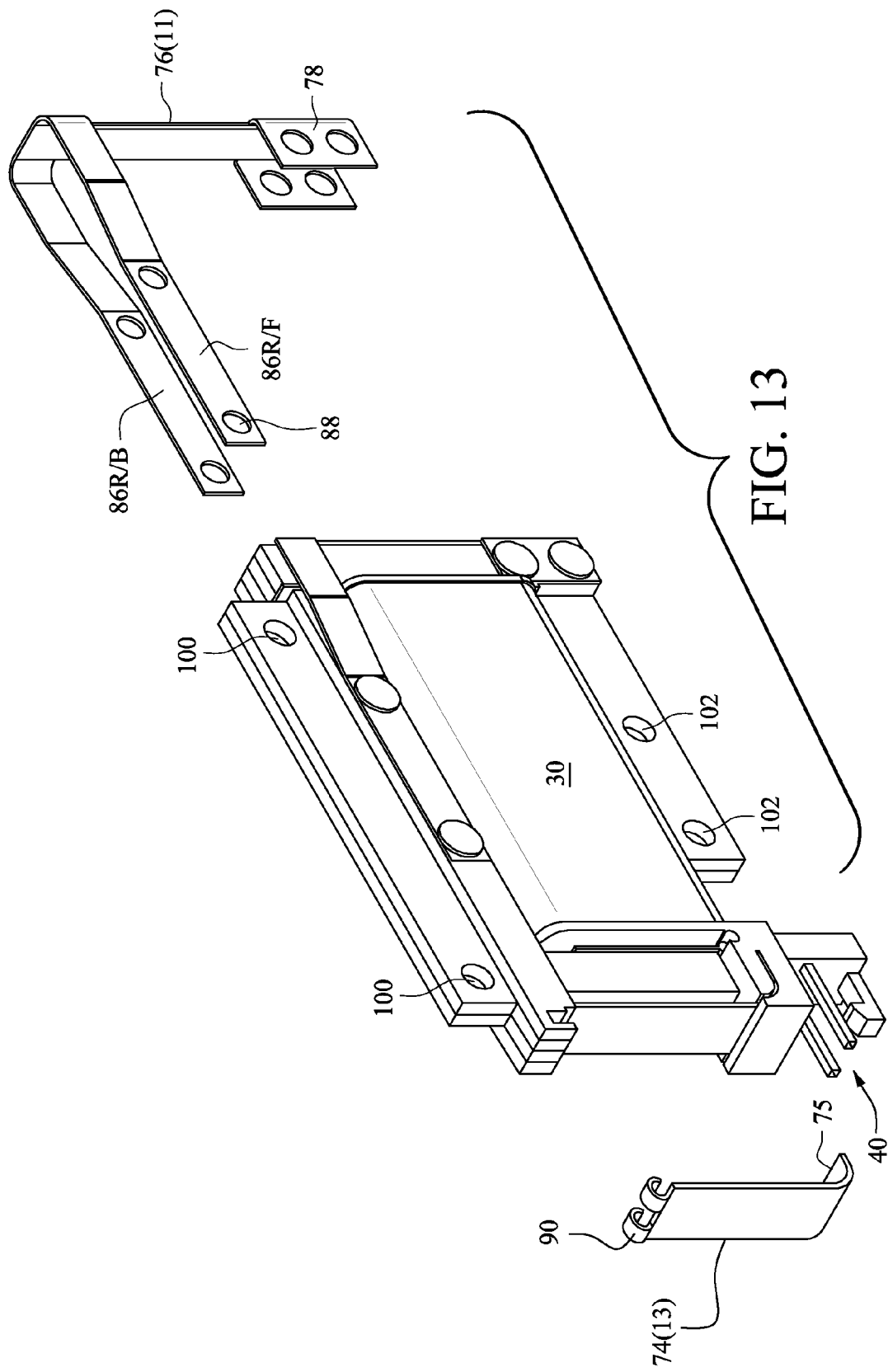
FIG. 13 is a left isometric exploded view of a haptic actuator according to a fourth example embodiment.

A fourth example embodiment is depicted by FIG. 13. In the fourth example embodiment of FIG. 13 the spring assembly comprises a right spring member 70R as in the embodiment of FIG. 11, but with no left spring member 70L. As such, the right spring member 70R comprises spring right post/spine 76(11) and a pair of spaced apart resilient member cantilever arms 86R, which are attached to a top of the spring right post/spine 76(11) and which extend in the axial direction. As in the FIG. 11 embodiment, a first right spring member cantilever arm 86R/F of the FIG. 13 embodiment extends in the axial direction on a front side of the actuator, while a second right spring member cantilever arm 86R/B extends in the axial direction on a back side of the actuator. Each of the spring member cantilever arms 86 are formed by plural resilient arm segments, including a collar segment by which each arm attaches to its respective post or spine; a distal segment which extends essentially parallel to the axial direction; and two segments which are intermediate the collar segment and the distal segment, as explained above with reference to FIG. 11.

In the embodiment of FIG. 13, the pair of spaced apart second resilient member cantilever arms 86 is formed to have an essentially U shape. The distal segments of spring member cantilever arms 86 have two aligned apertures 88. In assembly, the aligned apertures 88 of the spring member cantilever arms 86 are also aligned with apertures in the bridging lamination 66F, coil-external laminations 62F and 62R, and bridging lamination 66B, as understood from the previous embodiment. Thus, in the FIG. 13 embodiment the coil-external laminations of the plural pairs of laminations are positioned between and connected to the pair of spaced apart second resilient member cantilever arms 86. The spring right post/spine 76(11) has, at its lower distal end, fastening plate 78 having apertures formed therein through which the fasteners 80 extend.

Instead of having a left spring member 70L, the spring member 70 of the embodiment of FIG. 13 comprises spring left post 74(13). The spring left post 74(13) extends in the height or minor dimension 28 and is essentially planar, except for a pair of spaced apart semi-arced spring fingers 90 formed at an upper end thereof and a claw foot 75 formed at a bottom end. As in other embodiments, the claw foot 75 is configured to laterally slide for retention purposes into retention slot 56 (see FIG. 1). In one example "free state" implementation, the spring fingers 90 are not attached to other structure of the haptic actuator and thereby enable the first magnetic member 62 to lift away from the second magnetic member 60. In the free state implementation spring fingers 90 constrain the first magnetic member 62 in two directions. But in other implementations the structure is modified so that one degree of freedom may be allowed. In yet another "fixed" implementation, the spring fingers 90 may be connected to the first magnetic member 62, e.g., the first magnetic member 62 may be provided with a tear drop-shaped slot or channel into which the spring fingers 90 may snap or otherwise be secured. Thus, in the FIG. 13 example embodiment the right spring member 70R produces essentially all the elasticity and the spring left post 74(13) only provides support and location for the external lamination stack, e.g., for the first magnetic member 62.

Figure 14:
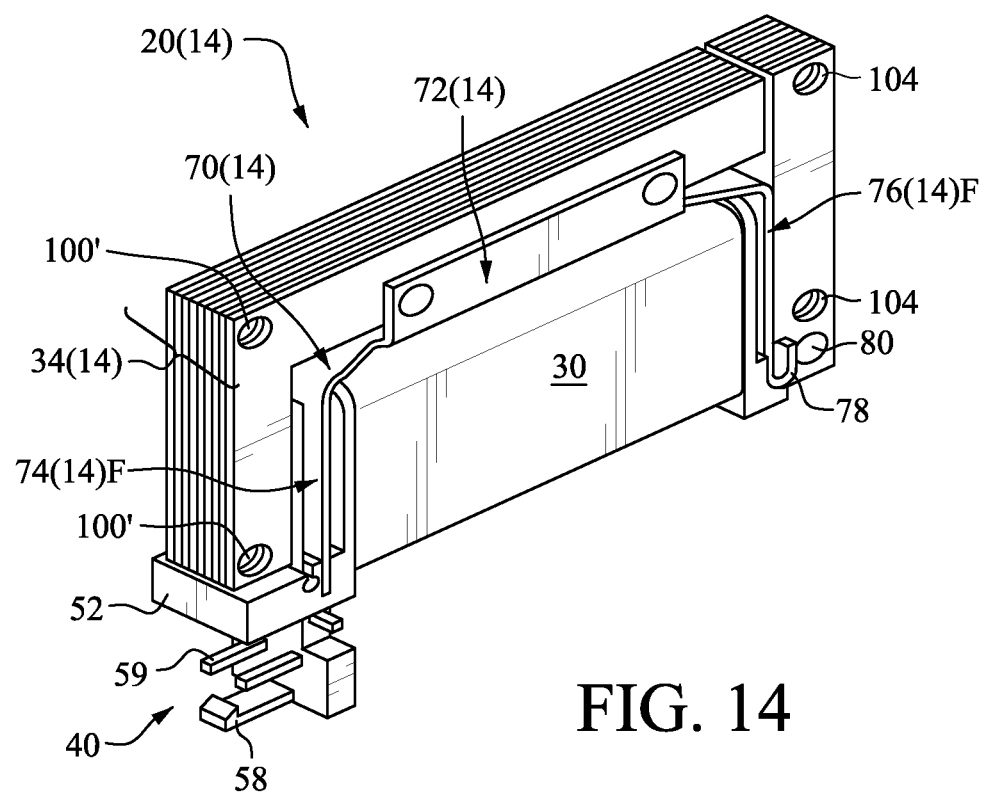
FIG. 14 is left isometric view of a haptic actuator according to another example embodiment.
Figure 14A:
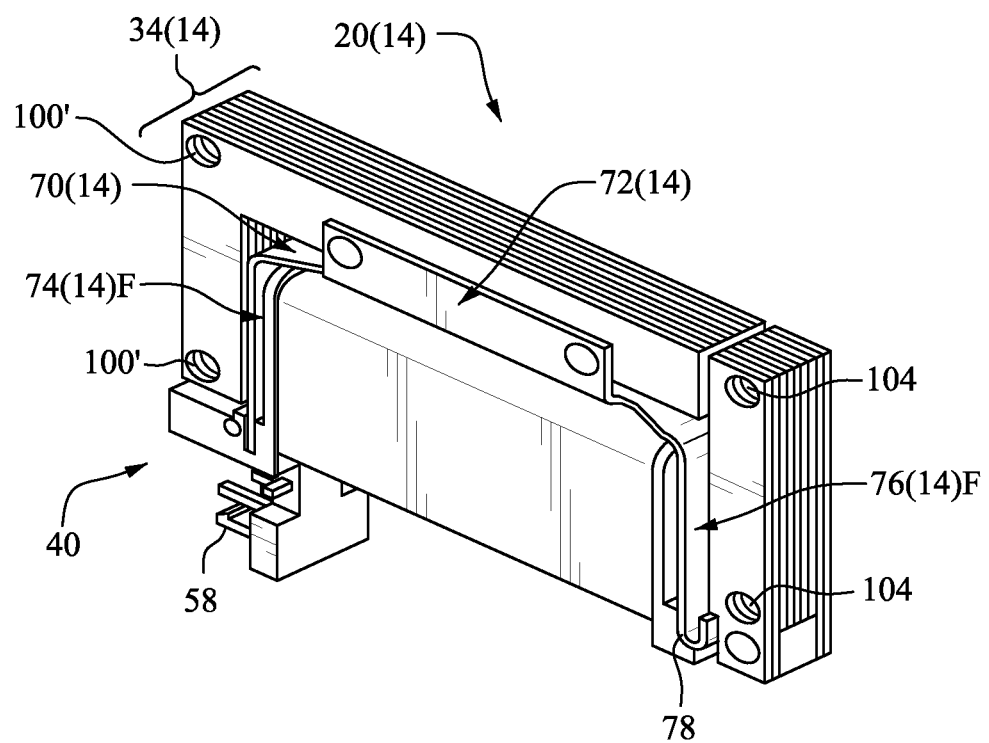
FIG. 14A is a right isometric view of the haptic actuator of FIG. 14.

FIG. 14, FIG. 14A, FIG. 14B, FIG. 14C, and FIG. 14D show haptic actuator 20(14) according to another example embodiment (referred to collectively as the embodiment of FIG. 14). The example embodiment of FIG. 14 has many features which are essentially the same as the example embodiment of FIG. 1, including but not limited to the following: coil body 30 (including, e.g., its coil interior space 36, coil left end cap 37, coil right end cap 38, and coil left end impact spacer 42) and the structure positioned to the left of coil body 30 (including, e.g., flexible connector retention block 52, the depending coil body connector post 54, and electrical connectors 59).

Figure 14C:
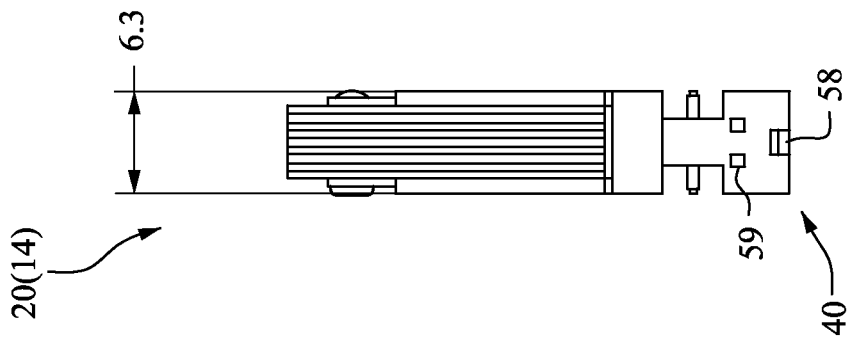
FIG. 14C is a left end view of the haptic actuator of FIG. 14.
Figure 14B:
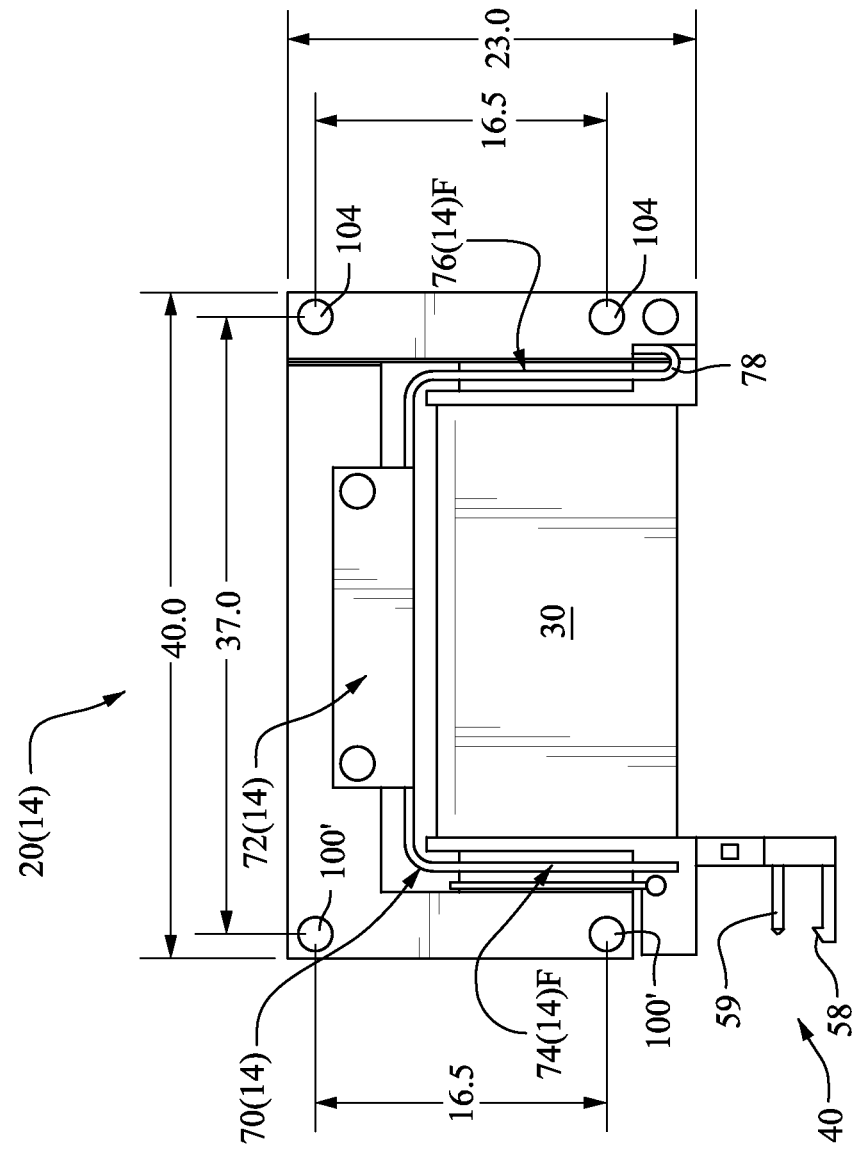
FIG. 14B is a front view of the haptic actuator of FIG. 14.
Figure 14D:
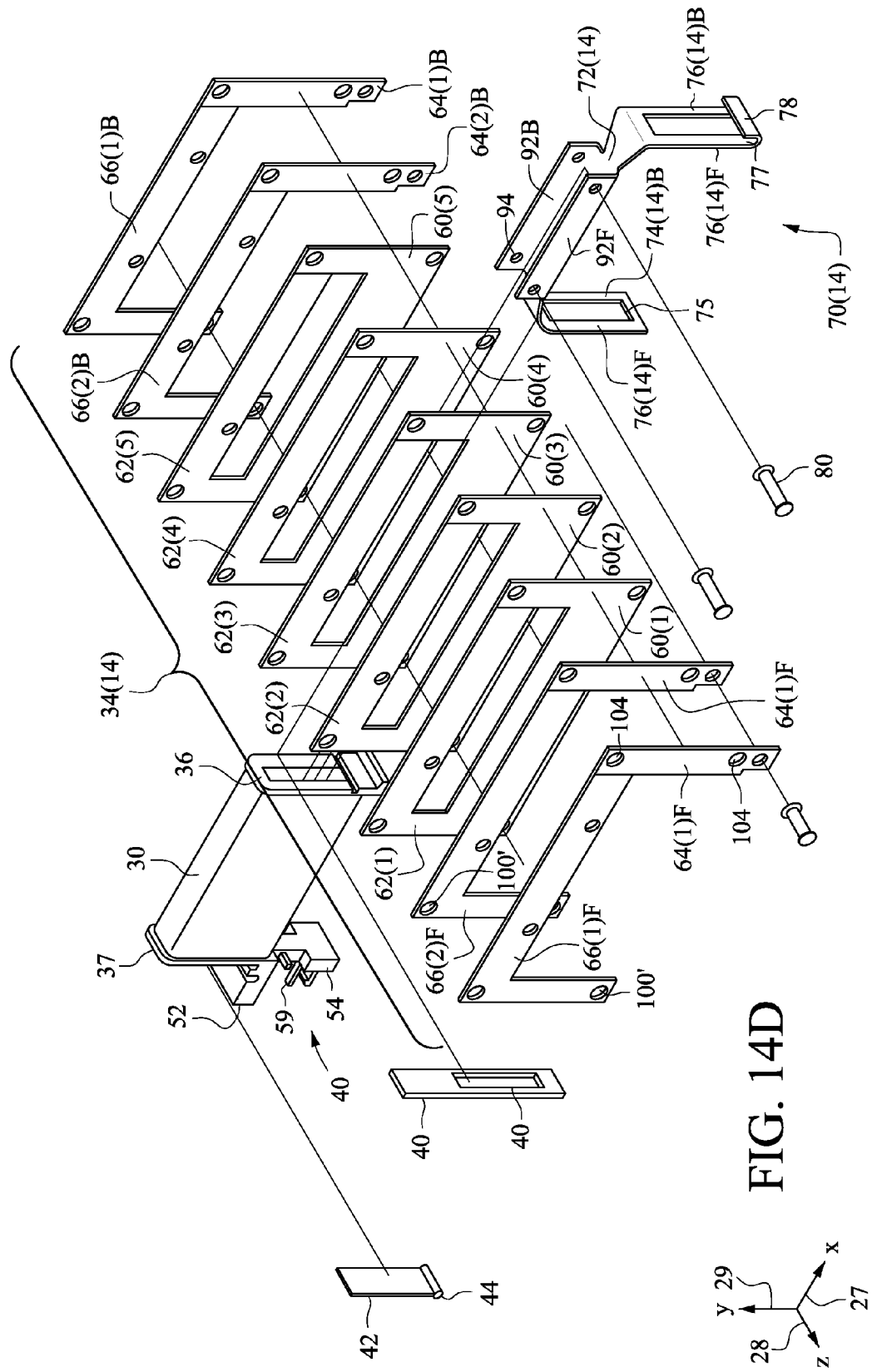
FIG. 14D is an exploded isometric view of the haptic actuator of FIG. 14.

The stack of laminations 34(14) of the haptic actuator 20(14) of the example embodiment of FIG. 14 differs from other embodiments in, e.g., the number of laminations and thus the number of planar layers in the stack of laminations 34(14). Whereas the stack of laminations 34 of the FIG. 1 embodiment comprises four layers, as shown in FIG. 14D the stack of laminations 34(14) of the FIG. 14 embodiment comprises nine lamination layers:

a first layer comprising bridging lamination 66(1)F and columnar lamination 64(1)F;

a second layer comprising bridging lamination 66(2)F and columnar lamination 64(2)F;

a third layer comprising coil-external lamination 62(1) and coil-accommodated lamination 60(1);

a fourth layer comprising coil-external lamination 62(2) and coil-accommodated lamination 60(2);

a fifth layer comprising coil-external lamination 62(3) and coil-accommodated lamination 60(3);

a sixth layer comprising coil-external lamination 62(4) and coil-accommodated lamination 60(4);

a seventh layer comprising coil-external lamination 62(5) and coil-accommodated lamination 60(5);

an eighth layer comprising bridging lamination 66(2)R and columnar lamination 64(2)R; and, a ninth layer comprising bridging lamination 66(1)R and columnar lamination 64(1)R.

The stack of laminations 34(14) may comprise layers of thin steel stampings, but the magnetic path could be made from other means such as casting (with subsequent machining), powdered metal or fine blanking. The number of laminations in the stack of laminations 34(14) is more than in other embodiments in view of the fact that the laminations are thinner, e.g., on the order of 0.5 mm thick, such that the center (main) part of the magnetic circuit that passes through the interior of the coil assembly 30 is 5 laminations (2.5 mm) and is encased on each side by two layers each, such that the total magnetic circuit thickness is 4.5 mm.

From the foregoing it is understood that the haptic actuator of the embodiment of FIG. 14 also comprises a first magnetic member 62; a second magnetic member 60; a field generator 30; and a resilient connector 70(14). Again it will be understood that reference numeral 62 is employed to represent any one or more of the laminations 62 of the stack 34(14) which may serve as the first magnetic member, and reference numeral 60 is employed to represent any one or more of the laminations 60 of the stack 34(14) which may serve as the second magnetic member. The first magnetic member 62 is configured to have a driven part of the haptically-actuated assembly mounted to the first magnetic member. The second magnetic member 60 is selectively separated by at least one air gap from the first magnetic member 62 and is configured to have a stationary part of the haptically-actuated assembly mounted on the second magnetic member 60, i.e., directly connected to the second magnetic member 60 and not through an intermediate structure such as a non-magnetic member. The second magnetic member 60 is positioned at least partially within the field generator or coil 30 and the first magnetic member 62 is positioned externally to the field generator 30. The resilient connector 72(14) is configured to connect together the first magnetic member 62 and the second magnetic member 60 in a manner to allow selective closing and opening of the at least one air gap upon selective activation and de-activation of the field generator.

In the example embodiment of FIG. 14 the first magnetic member 62 comprises at least a first portion and a third portion of a perimeter of the haptic actuator and the second magnetic member 60 comprises a fourth portion of a perimeter of the haptic actuator. The field generator 30 comprises a second portion of a perimeter of the haptic actuator. The resilient connector 70(14) is situated with the perimeter of the haptic actuator.

In an example implementation of the FIG. 14 embodiment, the first portion of the perimeter and the second portion of the perimeter extend along a length dimension of the haptic actuator; the third portion of the perimeter and the fourth portion of the perimeter extend along a height dimension of the haptic actuator. In an example embodiment, the extent of the haptic actuator 20(14) along the length dimension 27 is about 40 mm; the extent of the haptic actuator 20 along the height dimension 28 is about 23 mm; and extent of the haptic actuator 20 along the thickness dimension 29 is less than 8 mm, and preferably about 6.3 mm as shown in FIG. 14C. Thus, an aspect ratio of thickness of the haptic actuator 20(14) to its next smallest dimension is about 1:4.

Figure 1:
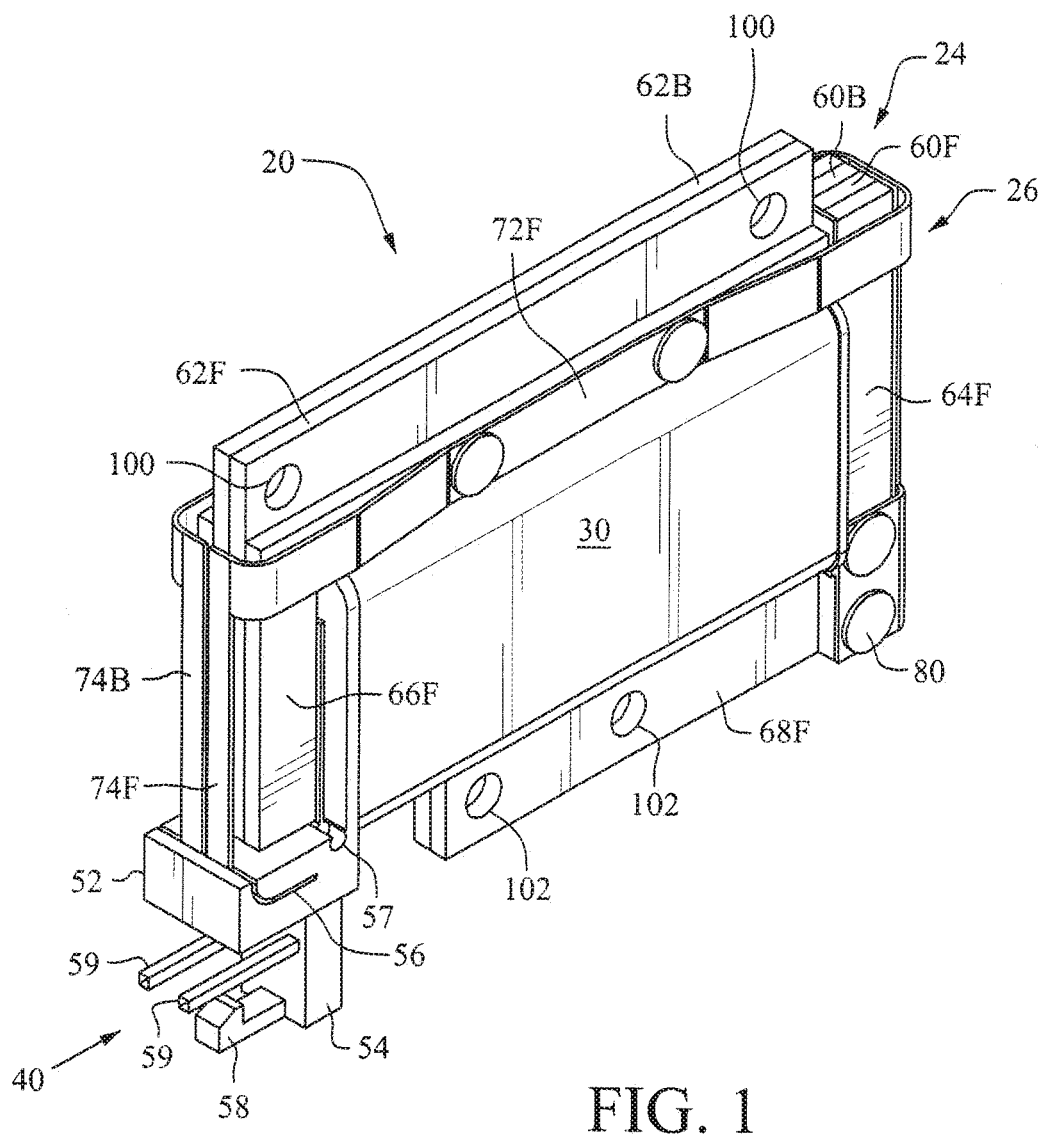
FIG. 1 is left isometric view of a haptic actuator according to a first example embodiment.
Figure 2:
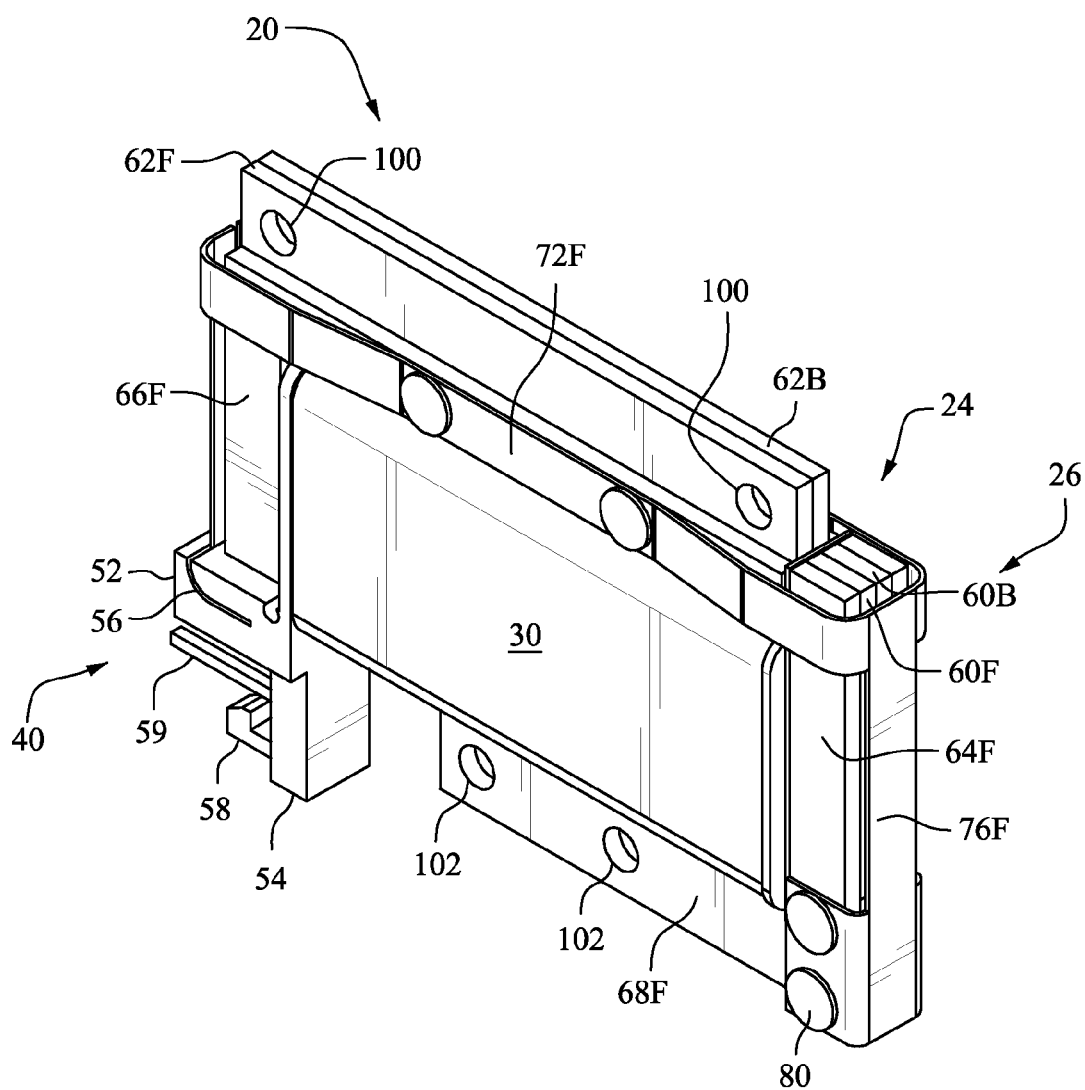
FIG. 2 is a right isometric view of the haptic actuator of FIG. 1.

A major difference between haptic actuator 20(14) of the example embodiment of FIG. 14 and the example embodiment of FIG. 1 is the configuration and placement of spring assembly 70(14). In the example embodiment of FIG. 14 spring assembly 70(14) is inboard to the frame assembly, e.g., positioned between coil body 30 and stack of laminations 34(14). Moreover, the resilient connector or spring assembly 70(14) lies entirely within the perimeter of the haptic actuator and does not itself form any segment of the perimeter of the haptic actuator. The spring assembly 70(14) of FIG. 14 has an essentially rectangular, three-sided arch structure and as such comprises overhead bridging spring 72(14); two parallel and spaced-apart spring left posts 74(14)F and 74(14)R (whose upper ends connect to overhead bridging spring 72(14) and whose lower ends connect to left post brace 75); and, two parallel and spaced-apart spring right posts 76(14)F and 76(14)R (whose upper ends connect to overhead bridging spring 72(14) and whose lower ends connect to right post brace 77). The two parallel and spaced-apart spring left posts 74(14)F and 74(14)R are spaced apart to straddle a left end of the second magnetic member 60; the two parallel and spaced-apart spring right posts 76(14)F and 76(14)R are spaced apart to straddle the right end of the second magnetic member 60. The right post brace 77 is curved upwardly and to the right to form claw foot 75 that is configured to laterally slide for retention purposes into a retention slot. The overhead bridging spring 72(14) comprises two lamination capture brackets 92F and 92R which extend along a majority of the length of overhead bridging spring 72(14) in its major dimension 27, and which extend in upstanding fashion in the height dimension 29. The two lamination capture brackets 92F and 92R are spaced apart in thickness dimension 29. Near their ends along the major dimension 27 the lamination capture brackets 92 have aligned apertures 94, which are also aligned with corresponding apertures in lamination members of the stack of laminations 34(14). The lamination capture brackets 92 are mounted on overhead bridging spring 72(14) so as to be spaced apart sufficiently to retain in the direction 29 all the laminations of the stack of laminations 34(14). Fasteners 80 extend through the apertures 94 and through the apertures in the lamination members of the stack of laminations 34(14).

Thus, the haptic actuator 20(14) of the example embodiment of FIG. 14 includes a self-contained spring, e.g., spring assembly 70(14). Other haptic actuators position the spring outside the magnetic path. While the FIG. 14 embodiment may not achieve any particular magnetic advantage in the spring assembly 70(14) being internal to the magnetic path, the FIG. 14 embodiment does permit spring assembly 70(14) to be completely self-contained in the haptic actuator 20(14), e.g., within the perimeter of the actuator, and thus prevents spring assembly 70(14) from interfering with other features, such as mounting features. In such interior implementation the resilient connector, also known as spring assembly 70(14) provides three dimensional support for the first magnetic member 62 and for the second magnetic member 60. Moreover, the spring assembly 70(14) is shorter in the length or major dimension 27 and thicker in the thickness dimension 29, and thus is stiffer in the lamination stacking direction of thickness dimension 29. There may also be an advantage if the spring is magnetic but supported on the outside of the legs (away from the air gap) but inside on the path that is parallel to motion. Also, with the spring entirely on the inside of magnetic path, if the spring material were magnetic, it may be detrimental to the production of force, mainly because it would be shorting the flux away from the air gap.

The haptic actuator 20(14) of the example embodiment of FIG. 14 also differs from other example embodiments in that mounting holes have rotated essentially 90°. In particular, the mounting holes 100' for mounting the driven part of the haptically-actuated assembly to the first magnetic member 62 extend linearly along the height dimension 28 at a first end of the haptic actuator and the mounting holes 104 for mounting the stationary part of the haptically-actuated assembly to the second magnetic member 60 extend linearly along the height dimension 28 at a second end of the haptic actuator. The spring assembly 70(14) is inboard to the frame assembly, e.g., positioned between coil body 30 and the stack of laminations. In previous haptic actuators forces were transmitted from mounting to load in a shear-type motion with the direction of motion of the load being parallel to the mounting surface. By virtue of the locations of the mounting holes 100', 104 of the FIG. 14 embodiment, in the FIG. 14 embodiment the load moves in a direction perpendicular to mounting surface.

The example embodiment of FIG. 14 also provides a rigid positioning and anchoring of the coil assembly to the lamination stack 34(14). This is beneficial because the spring assembly 70(14) is mounted to the coil assembly 30, which means that if the coil assembly 30 were to move, the relative positioning of the two lamination stacks, e.g., the relative positioning of the two separated laminations in each lamination layer or plane, would be disturbed.

The haptic actuator 20(14) of the example embodiment of FIG. 14 also retains its thinness in one direction while, at the same time, produces equivalent forces of much thicker units yet allows certain packaging advantages.

Figure 15:
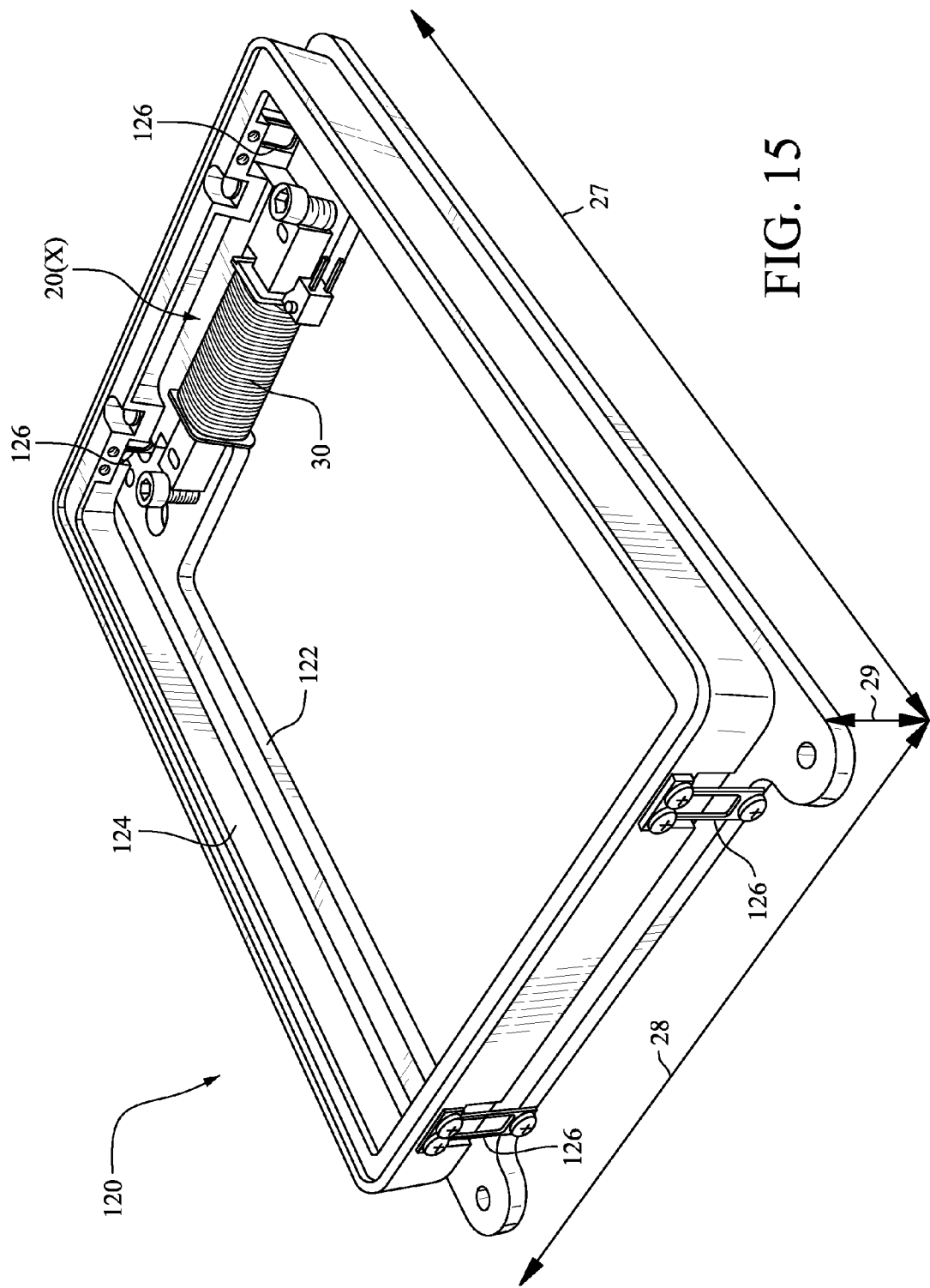
FIG. 15 is a perspective view illustrating an example haptic-hosting environment in which embodiments of haptic actuators may be utilized.

Mention has been made above of features of the haptic actuators of the various embodiments by which the haptic actuators or components thereof may be attached to mounting surface(s). FIG. 15 illustrates a haptic-hosting environment in which any of the foregoing embodiments of haptic actuators may be utilized. In particular, FIG. 15 shows haptic-hosting structure 120 as comprising two essentially rectangular frames 122 and 124. The rectangular frames 122 and 124 have their rectangular shape in a plane which includes both the length or major dimension 27 and the height or minor dimension 28 as previously described herein. The rectangular frames 122 and 124 are spaced apart from one another in the thickness dimension 29. A higher or upper rectangular frame 124, also known as a carrier frame, is held aloft over lower or base rectangular frame 122, also known as the stationary frame, by a suspension system comprising four suspension spring assemblies 126, each suspension spring assembly 126 preferably being located near a corner of the rectangular shape. Non-limiting examples of the haptic-hosting structure 120 of FIG. 15 are illustrated, for example, in U.S. Provisional Patent Application 61/745,250, filed Dec. 21, 2012, which is incorporated herein by reference. The base rectangular or stationary frame 122 may comprise or be fastened to a rigid member, such as a vehicle dash board or appliance console, for example. The upper or carrier rectangular frame 124 may serve to hold or carry some type of user input/output electronic device, such as table type display screen (having appropriate display presentation such as that provided by an electronic table or intelligent phone, for example). FIG. 15 further shows an example location of any of the haptic actuators depicted herein or encompassed hereby, collectively referenced as haptic actuator 20(X). It will be appreciated that the first magnetic member 62 of each of the haptic actuators 20(X), being moveable, connects to the upper or carrier rectangular frame 124 and the second magnetic member 60 (or the non-magnetic member 68) connects to the base rectangular or stationary frame 122. For example, as explained above for the example embodiment of FIG. 1, the first magnetic member 62 comprises apertures 100 through which a fastener may affix the first magnetic member 62 to the driven part of the haptically-actuated assembly, e.g., to the upper or carrier rectangular frame 124, and the second magnetic member 60 comprises apertures 102 through which a fastener may affix the second magnetic member 60 to a stationary part of the haptically-actuated assembly directly, e.g., to the base rectangular or stationary frame 122. Similarly, as explained above for the example embodiment of FIG. 14, the first magnetic member 62 comprises apertures 100' through which a fastener may affix the first magnetic member 62 to the driven part of the haptically-actuated assembly, e.g., to the upper or carrier rectangular frame 124, and the second magnetic member 60 comprises apertures 104 through which a fastener may affix the second magnetic member 60 to a stationary part of the haptically-actuated assembly directly, e.g., to the base rectangular or stationary frame 122.

Although the description above contains many specificities, these should not be construed as limiting the scope of the invention but as merely providing illustrations of some of the presently preferred embodiments of this invention. It will be appreciated that the scope of the present invention fully encompasses other embodiments which may become obvious to those skilled in the art, and that the scope of the present invention is accordingly not to be limited. For example, whereas FIG. 1 shows a spring entirely external to the magnetic field, it should be understood that a spring support may be partially inside and partially outside the magnetic field. Moreover, a haptically-actuated assembly may comprise more than one haptic actuator.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A haptic actuator configured for use with a haptically-actuated assembly, the haptic actuator comprising:
    a first magnetic member configured to have a first part of the haptically-actuated assembly mounted to the first magnetic member;
    a second magnetic member which is selectively separated by at least one air gap from the first magnetic member, second magnetic member configured to have a second part of the haptically-actuated assembly connected to the second magnetic member;
    a field generator, the second magnetic member being positioned at least partially within the field generator and the first magnetic member being positioned externally to the field generator;
    a resilient connector configured to connect together the first magnetic member and the second magnetic member in a manner to allow selective closing and opening of the at least one air gap upon selective activation and de-activation of the field generator;
    wherein at least one of the first magnetic member and the second magnetic member is directly mounted to the haptically-actuated assembly.

2. The haptic actuator of claim 1,
    wherein the first magnetic member comprises a mounting feature to which the first part of the haptically-actuated assembly is directly mounted; and
    further comprising a non-magnetic member connected to second magnetic member, the non-magnetic member comprising a mounting feature configured to have the second part of the haptically-actuated assembly directly mounted thereto.

3. The haptic actuator of claim 1, wherein the first magnetic member comprises at least a first portion of a perimeter of the haptic actuator.

4. The haptic actuator of claim 3, further comprising a non-magnetic member connected to second magnetic member, the non-magnetic member configured to have the second part of the haptically-actuated assembly mounted to the non-magnetic member.

5. The haptic actuator of claim 4, wherein the non-magnetic member comprises at least a second portion of a perimeter of the haptic actuator, the second portion of the perimeter being essentially parallel to the first portion of the perimeter comprised by the first magnetic member, the first portion of the perimeter and the second portion of the perimeter being orthogonal with respect to a height dimension of the haptic actuator.

6. The haptic actuator of claim 5, wherein the resilient connector comprises a first post member and a second post member which is parallel to the first post member, wherein the first post and the second post respectively comprise a third of portion of the perimeter and a fourth portion of the perimeter of the haptic actuator, the third of portion of the perimeter and the fourth of portion of the perimeter being separated by a length dimension of the haptic actuator, the third portion of the perimeter and the fourth portion of the perimeter being orthogonal to both the first portion of the perimeter and the second portion of the perimeter.

7. The haptic actuator of claim 1, wherein the second magnetic member comprises a mounting feature configured to have the second part of the haptically-actuated assembly directly mounted thereto.

8. The haptic actuator of claim 7, wherein the first magnetic member comprises at least a first portion and a third portion of a perimeter of the haptic actuator, wherein the second member comprises a fourth portion of a perimeter of the haptic actuator, wherein the field generator comprises a second portion of a perimeter of the haptic actuator, and wherein the resilient connector is situated within the perimeter of the haptic actuator.

9. The haptic actuator of claim 1, wherein the resilient connector does not contact the haptically-actuated assembly.

10. The haptic actuator of claim 1, wherein the resilient connector does not have the haptically-actuated assembly connected directly thereto.

11. The haptic actuator of claim 1, wherein the resilient connector comprises plural resilient portions; and wherein the first magnetic member and the second magnetic member are attached to different resilient portions of the resilient connector.

12. The haptic actuator of claim 1, wherein the resilient connector comprises a bridging spring member which extends between opposing spring post members, wherein the first magnetic member is connected to the bridging spring member, wherein the second magnetic member is connected to a first of opposing spring post members.

13. The haptic actuator of claim 12, wherein a second of the opposing spring post members is connected to a field generator connector assembly.

14. The haptic actuator of claim 12, wherein the first magnetic member comprises at least one first magnetic member aperture which is aligned with at least one bridging spring aperture; and wherein a fastener extends through the at least one first magnetic aperture and the at least one bridging spring aperture to connect the first magnetic member to the bridging spring member.

15. The haptic actuator of claim 13, wherein the first magnetic member comprises plural laminations, and wherein the bridging spring member comprises two lamination capture brackets which are spaced apart to retain the plural laminations comprising the first magnetic member.

16. The haptic actuator of claim 1, wherein the first magnetic member comprises plural laminations stacked in a stacking direction, wherein the resilient connector comprises a first resilient member and a second resilient member which are spaced apart in the stacking direction, both the first resilient member and the second resilient member being configured to permit oscillation in the size of the at least one air gap, and wherein the plural laminations comprising the first magnetic member are at least partially situated between a portion of the first resilient member and a portion of the second resilient member in the stacking direction.

17. The haptic actuator of claim 13, wherein:
the first resilient member comprises:
a first resilient member spine situated at a first end of the field generator:
a pair of spaced apart first resilient member cantilever arms which are attached to the first resilient member spine;
the second resilient member comprises:
a second resilient member spine situated at a second end of the field generator;
a pair of spaced apart second resilient member cantilever arms which are attached to the second resilient member spine and which extend toward the pair of spaced apart first resilient member cantilever arms; and
wherein the first magnetic member is positioned between and connected to the pair of spaced apart first resilient member cantilever arms and the pair of spaced apart second resilient member cantilever anus.

18. The haptic actuator of claim 17, wherein the pair of spaced apart first resilient member cantilever arms and the pair of spaced apart second resilient member cantilever anus overlap each other.

19. The haptic actuator of claim 17, wherein the second magnetic member is connected to the second resilient member spine.

20. The haptic actuator of claim I, wherein the resilient connector comprises one resilient member configured to permit oscillation in the size of at least one air gap, and wherein the one resilient member comprises:
a resilient member spine to which the second magnetic member is connected;
a pair of spaced apart resilient member cantilever arms which are attached to the resilient member spine and between which the first magnetic member is connected.

21. The haptic actuator of claim 1,
wherein the field generator comprises a coil body, the coil body comprising a coil wound about a coil axis to form a coil interior space, the coil body comprising apertures in two opposing axial ends of the coil body;
plural pairs of magnetic laminations lying in corresponding plural parallel planes, each pair of laminations comprising:
the second magnetic member comprising a coil-accommodated lamination extending in an axial direction parallel to the coil axis, through the coil interior space, and protruding in the axial direction out of the apertures in the two opposing axial ends of the coil body;
the first magnetic member comprising a coil-external lamination extending in a direction parallel to the coil axis and outside the coil body;
wherein the resilient connector comprises at least one resilient member configured to permit oscillation in the axial direction of the size of the at least one air gap between the coil-accommodated lamination and the coil-external lamination of each pair in accordance with application and removal of power to the coil.

22. A haptic actuator configured for use with a haptically-actuated assembly, the haptic actuator comprising:
a first magnetic member which forms at least a portion of a perimeter of the haptic actuator;
a second magnetic member which forms at least another portion of the perimeter of the haptic actuator and which is selectively separated by at least one air gap from the first magnetic member;
a field generator, the second magnetic member being positioned at least partially within the Held generator and the first magnetic member being positioned externally to the field generator;
a resilient connector configured to connect together the first magnetic member and the second magnetic member in a manner to allow selective closing and opening of the at least one air gap upon selective activation and de-activation of the field generator, the resilient connector further being configured to be located essentially within the perimeter of the haptic actuator.

23. The haptic actuator of claim 22, wherein al least one of the first magnetic member and the second magnetic member are configured to be directly mounted to the haptically-actuated assembly.

24. The haptic actuator of claim 23, wherein the first magnetic member is configured to have a first part of the haptically-actuated assembly mounted to the first magnetic member and wherein the second magnetic member is configured to have a second part of the haptically-actuated assembly connected to the second magnetic member.

25. The haptic actuator of claim 22, wherein at least a portion of the resilient connector extends between the first magnetic member and the second magnetic member in a direction parallel to the air gap which is selectively opened and closed between the first magnetic member and the second magnetic member.

26. The haptic actuator of claim 25, wherein the first magnetic member comprises plural laminations, and wherein the portion of the resilient connector which extends between the first magnetic member and the second magnetic member comprises two lamination capture brackets which are spaced apart to retain the plural laminations comprising the first magnetic member.

27. The haptic actuator of claim 1, wherein the a second magnetic member is selectively separated from the first magnetic member by a first air gap and a second air gap, where wherein the first magnetic member and the second magnetic member are positioned whereby upon the activiation of the field generator, flux lines traveling though the second magnetic member, across the first air gap to the first magnetic member, across the second air gap and back to the second magnetic member.

28. The haptic actuator of claim 1, wherein the first part of the haptically-actuated assembly which is mounted to the first magnetic member is a driven part of the haptically-actuated assembly and therein the second part of the haptically-actuated assembly which is connected to the second magnetic member is a stationary part of the haptically-actuated assembly.

29. The haptic actuator of claim 24, wherein the first part of the haptically-actuated assembly which is mounted to the first magnetic member is a driven part of the haptically-actuated assembly and therein the second part of the haptically-actuated assembly which is connected to the second magnetic member is a stationary part of the haptically-actuated assembly.

30. A haptic actuator configured for use with a haptically-actuated assembly, the haptic actuator comprising:
   a first magnetic member;
   a second magnetic member which is selectively separated by at least one air gap from the first magnetic member;
   a field generator, the second magnetic member being positioned at least partially within the field generator and the first magnetic member being positioned externally to the field generator;
   a resilient connector configured to connect together the first magnetic member and the second magnetic member in a manner to allow selective closing and opening of the at least one air gap upon selective activation and deactivation of the field generator,
   wherein the resilient connector comprises plural resilient portions; and wherein the first magnetic member and the second magnetic member are attached to different resilient portions of the resilient connector.

\* \* \* \* \*